(12) United States Patent
Nakagawa et al.

(10) Patent No.: US 6,719,402 B2
(45) Date of Patent: Apr. 13, 2004

(54) INK JET PRINTING APPARATUS AND INK JET PRINTING METHOD

(75) Inventors: Yoshinori Nakagawa, Kanagawa (JP); Jiro Moriyama, Kanagawa (JP); Hidehiko Kanda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 22 days.

(21) Appl. No.: 09/994,866

(22) Filed: Nov. 28, 2001

(65) Prior Publication Data

US 2002/0070997 A1 Jun. 13, 2002

(30) Foreign Application Priority Data

Nov. 30, 2000 (JP) .......................... 2000-366294

(51) Int. Cl.⁷ ............................. B41J 23/00; B41J 2/205
(52) U.S. Cl. ............................................ 347/37; 347/15
(58) Field of Search ............................... 347/5, 12–15, 347/19, 37, 40–43, 54–56, 63, 65, 173, 174, 188, 190, 191

(56) References Cited

U.S. PATENT DOCUMENTS

| | | | |
|---|---|---|---|
| 4,313,124 A | 1/1982 | Hara | 346/140 R |
| 4,345,262 A | 8/1982 | Shirato | 346/140 R |
| 4,459,600 A | 7/1984 | Sato | 346/140 R |
| 4,463,359 A | 7/1984 | Ayata | 346/1.1 |
| 4,558,333 A | 12/1985 | Sugitani | 346/140 R |
| 4,723,129 A | 2/1988 | Endo | 346/1.1 |
| 4,740,796 A | 4/1988 | Endo | 346/1.1 |
| 5,844,585 A * | 12/1998 | Kurashima et al. | 347/43 |
| 5,883,644 A * | 3/1999 | Nicoloff, Jr. et al. | 347/43 |
| 6,086,185 A | 7/2000 | Inui | 347/43 |
| 6,116,720 A | 9/2000 | Inui | 347/43 |
| 6,164,756 A | 12/2000 | Takahashi | 347/43 |
| 6,299,287 B1 * | 10/2001 | Williams et al. | 347/43 |
| 6,336,703 B1 * | 1/2002 | Otsuki | 347/41 |
| 6,367,912 B1 * | 4/2002 | Kishimoto et al. | 347/43 |
| 6,378,982 B2 | 4/2002 | Ono | 347/41 |
| 6,457,806 B2 * | 10/2002 | Hickman | 347/37 |

FOREIGN PATENT DOCUMENTS

| | | |
|---|---|---|
| JP | 54-56847 | 5/1979 |
| JP | 55-113573 | 9/1980 |
| JP | 59-123670 | 7/1984 |
| JP | 59-138461 | 8/1984 |
| JP | 60-71260 | 4/1985 |

* cited by examiner

*Primary Examiner*—Stephen D. Meier
*Assistant Examiner*—An H. Do
(74) *Attorney, Agent, or Firm*—Fitzpatrick, Cella, Harper & Scinto

(57) ABSTRACT

The ink jet printing apparatus of this invention is intended to reduce degradations in image quality caused by color mixing due to bleeding of inks of different colors and thereby enable printing an image with high quality at high speed. To this end, in the ink jet printing apparatus of this invention, a plurality of different nozzle groups are main-scanned M times ($M \geq 2$) over a print area to print all print data to be printed on the print area to complete an image. The print head, successively perform the main scans over the print area in such a way that the print head, located at the front position in the printing order, performs an Mth main scan with a lower print density than that of an Nth main scan ($1 \leq N < M$).

23 Claims, 13 Drawing Sheets

INK JET PRINTING APPARATUS AND INK JET PRINTING METHOD

This application is based on Patent Application No. 2000-366294 filed Nov. 30, 2000 in Japan, the content of which is incorporated hereinto by reference.

BACKGROUND OF THE INVENTION

1. Field of the Invention

The present invention relates to an ink jet printing apparatus and an ink jet printing method which eject inks of different colors from at least two print heads for recording, and more particularly to a method of reducing degradation of image quality due to bleeding of ink.

2. Description of the Related Art

Printing apparatus used as printing means for printing images and others in printers, copying machines and facsimiles, and those used as print output devices for combination electronic equipment and workstations, including computers and word processors, are all designed to record images on a recording material (hereinafter referred to also as a print medium), such as paper and plastic thin plate, according to image information (all output information including character information).

Such printing apparatus may be classed into an ink jet system, a wire dot printing system, a thermal printing system and a laser beam printing system according to the printing method. Of these systems, the printing apparatus of the ink jet system (hereinafter referred to as an ink jet printing apparatus) ejects ink from a printing means including a print head onto a print medium to perform printing and has a variety of advantages, such as a capability to easily increase resolution, a high printing speed, a low noise and a low cost compared with printing apparatus of other systems.

In recent years as the importance of color outputs such as color images grows, a number of color ink jet printing apparatus with high quality matching that of a silver halide photography have been developed.

Such an ink jet printing apparatus improves the printing speed by using a print head which has a plurality of print elements integrally arrayed therein with high degree of accumulation and also a plurality of ink nozzles and liquid paths formed therein with high degree of accumulation in a one-to-one relationship with each print element. To print a color image, a plurality of such print heads are provided one for each color ink to be ejected.

FIG. 9 is a schematic diagram showing a nozzle array in an example of the print head.

In FIG. 9 reference number 101 represents a black print head with an array of 320 nozzles at a degree of accumulation of 600 nozzles per inch (600 dpi) to eject a black ink. 102, 103 and 104 represent cyan, magenta and yellow ink print heads, respectively, each with 128 nozzles with a degree of accumulation of 600 nozzles per inch (600 dpi). Y indicates a direction in which the print paper is fed (sub-scan direction).

The black print head 101 uses all 320 nozzles in a monochrome print mode for printing a monochromatic image such as sentences and, in a color mode, uses 128 nozzles from the top of the drawing to print a color image such as a photographic image. The color print heads 102, 103, 104 are used only in the color mode using all 128 nozzles. The color nozzles for the color mode are shifted 128 nozzles in the paper feed direction from the black nozzles.

Now, the color mode operation will be explained.

FIG. 10 shows the construction of main components of the printing apparatus that prints on paper by using the print heads described above. In the figure, 201 represents ink jet cartridges (printing means). These comprise four color ink tanks containing black, cyan, magenta and yellow inks and four print heads 202 corresponding to these ink tanks.

Designated 203 is a paper feed roller (sub-scanning means) which, together with an auxiliary roller 204, holds the print paper P and rotates in the direction of arrow to intermittently feed the print paper P in the Y direction. Denoted 205 are a pair of paper supply rollers which, like the rollers 203 and 204, hold the print paper P as they rotate. The rotating speed of the paper supply rollers 205 is set lower than that of the paper feed roller 203, generating a tension in the paper so that it is fed without slack.

Reference number 206 represents a carriage (main scanning means) that supports the four ink jet cartridges 201 and reciprocally moves (or scans) in the main scan direction X perpendicular to the paper feed direction Y. When the print heads 202 are not performing the printing operation or are subjected to the ejection recovery operation, the carriage 206 stands by at its home position h indicated by a dashed line.

The carriage 206 situated at its home position h, upon receiving a print start command, prints on the paper over a width of $128/600$ inches (about 5.42 mm) by using 128 nozzles of the print head 202 as it scans in the X direction. When the printing is finished up to the side end of the paper, the carriage returns to the home position h and again performs the scan in the X direction. After the first printing operation is finished and before the second printing starts, the paper feed roller 203 rotates in the direction of arrow to feed the paper a distance equal to $128/600$ inches in the Y direction. In the second and subsequent printing operations, the color print heads are also used.

At each scan of the carriage 206, the printing over a width of $128/600$ inches using the print heads 202 and the paper feeding are repeated until one whole page is printed. Such a print mode is referred to as a one-pass print mode.

The one-pass print mode is explained in detail by referring to the drawings.

FIG. 11 is a schematic diagram showing the printing method in the one-pass print mode.

In FIG. 11, reference number 301 and 302 represent a black print head and a color print head. The color print heads 302 for cyan, magenta and yellow are all arranged in line in the sub-scan direction, so the print time difference between the black print head 301 and any of the color print heads is almost equal. That is, the time difference between each of the color print heads and the black print head in the first and second scans is one scan period T for all color print heads. Hence, in FIG. 11 the color print heads are shown as one print head for simplicity.

Here, a so-called one-way printing (hereinafter refereed to also as an 1-pass printing) is employed in which the printing is done only when the carriage moves forward. Thus, one scan period means the time it takes for the carriage to make a forward movement for printing and a backward movement for returning. In a so-called two-way printing (hereinafter refereed to also as a 2-pass printing) in which the printing is done in both the forward and backward scans of the carriage, the one scan period means the time taken by the carriage to make a forward and a backward movement for printing and return to its original position. A print area A represents an area that is printed by the 128 nozzles arrayed in the Y direction. That is, the print area A is 128 nozzles wide in the Y direction.

In the first scan, the black print head 301 completes printing all print data that is to be printed in the print area A. After this, the print paper is fed in the Y direction a distance equal to the length of 128 nozzles.

Next, in the second scan, the color print head 302 completes printing all color print data that is to be printed in the print area A. When the first and second scans are finished, the printing of black and color print data in the print area A is completed.

As described above, in the 1-pass print mode, when the black print area and the color print area adjoin each other, the color printing is performed with a time difference T after the black printing has been done. Thus, the color ink may be printed adjacent to the black ink before the black ink is fixed on the paper. In that case, the black and color inks may bleed to mix together, degrading the quality of printed image.

Another print mode used in the ink jet printing apparatus is a multi-pass print mode. In this multi-pass print mode, the print data to be printed in a print area is printed in two or more overlapping passes over the same area to complete the printing.

Next, the multi-pass print mode will be explained.

Here, we take for example a so-called 2-pass printing in which the printing is done in two overlapping passes on the same print area. In the 2-pass printing, when it receives a print start command, the carriage 206 situated at the home position h moves in the X direction to print on the paper over a width of $64/600$ inches (about 2.71 mm) by using the black print head 301.

Dots that are printed during this scan are derived from the image data to be printed by thinning out it to one-half with a predetermined mask pattern. When the printing up to the side end of the paper is completed, the carriage 206 returns to the home position h and again moves forward in the X direction for printing. After the first scan is finished and before the second scan starts, the paper feed roller 203 rotates in the direction of arrow to feed the paper $64/600$ inches in the Y direction.

During the second scan, too, only the black print head 301 is used. In the third and following scans, the color print head 302 is also used. All the print areas are scanned twice by the printing head of each color and are completed by printing the printing data thinned out by the mask pattern in each scan respectively. The above description concerns a multi-pass print mode that performs two overlapping scans. A multi-pass print mode that performs M overlapping scans over the same print area is referred to as an M-pass print mode.

FIG. 12 shows 2-pass mask patterns used in the 2-pass print mode.

In the figure reference number 401 represents a mask pattern for a first pass and 402 represents a mask pattern for a second pass.

The mask patterns shown here are 4×4 masks, in which image data overlapping black pixels constitutes pixel data to be printed in each pass (scan). The mask pattern for the first pass 401 and the mask pattern for the second pass 402 have checkerboard patterns and are complementary to each other. The mask patterns are not limited to those shown in FIG. 12 and may use other patterns as long as the first- and second-pass mask patterns each have a print density of 50%.

The relation between the 2-pass print mode and the 2-pass mask patterns will be explained in detail by referring the drawings.

FIG. 13 is a schematic diagram showing the printing method in the 2-pass print mode.

In FIG. 13, reference numbers 301 and 302 represent black and color print heads, respectively, as in the case of FIG. 11. In the first to the fourth scan, the time differences between the adjoining scans are all T (one scan period). A print area B represents an area whose length in the Y direction is equal to a distance covered by 64 nozzles. That is, the length in Y direction of the print area B is equal to one-half the length of nozzles used.

In the first scan, the black print head 301 prints the print area B using a first-pass mask pattern (print density 50%). Then, the print paper is fed a distance equal to 64 nozzles in the Y direction.

In the second scan, the black print head 301 prints the print area B using a second-pass mask pattern (print density 50%) to complete a black ink image. Then, the print paper is fed a distance of 64 nozzles in the Y direction.

In the third scan, the color print head 302 prints the print area B using the first-pass mask pattern (print density 50%). Then, the print paper is fed a distance of 64 nozzles in the Y direction.

In the fourth scan, the color print head 302 prints the print area B using the second-pass mask pattern (print density 50%), thus completing the printing in the print area B.

When in the 2-pass print mode the black print area and the color print area adjoin each other, the color ink that adjoins the black ink printed in the first scan with a print density of 50% is printed a time difference of 2T later with a print density of 50%. Therefore, the black ink and the color ink do not bleed and mix together as severely as in the 1-pass print mode. As for the black ink printed in the second pass with a print density of 50%, because the color ink that is printed a time difference of T later has a print density of 50%, the degree of bleeding and mixing of this color ink and the black ink is smaller than in the 1-pass print mode.

Similarly, in a multi-pass print mode with three or more passes, the degree of ink bleeding is smaller than in the 1-pass print mode. The greater the number of passes, the smaller the degree of ink bleeding and the smaller the possibility of mixing of the color ink and the black ink.

The checkerboard pattern of the 2-pass print mode described above is proposed in Japanese Patent Application Laid-open No. 55-113573.

In the multi-pass print mode, however, an increase in the number of passes results in an increase in the printing time, giving rise to a problem that a sufficient printing speed cannot be obtained. When the number of passes is reduced to increase the printing speed, the problem of bleeding and mixing of different color inks becomes more serious. Hence, realizing the printing at an increased speed and with a reduced color mixing has been one of the problems very difficult to solve in the ink jet printing apparatus.

SUMMARY OF THE INVENTION

An object of the present invention is to solve the problems described above and provide an ink jet printing apparatus and an ink jet printing method which eject inks of different colors from at least two print heads for recording and can reduce degradations in image quality caused by color mixing due to bleeding of ink and enable high-speed printing.

According to a first aspect, the present invention provides an ink jet printing apparatus which comprises: a printing means having a plurality of print heads with a plurality of nozzle groups, each of the nozzle groups having a predetermined number of print nozzles, each of the print heads ejecting one of inks of different colors; a main scanning means for moving the printing means relative to a print medium in a main scan direction; a sub-scanning means for moving the print medium a distance equal to the nozzle group relative to the printing means in a sub-scan direction, the sub-scan direction crossing the main scan direction; and a masking means for thinning out print data to a predetermined print density and supplying the thinned out print data to the associated nozzle group, the print data representing an image to be printed on each of print areas that are moved intermittently by the sub-scanning means; wherein the plurality of different nozzle groups are main-scanned M times ($M \geq 2$) over each of the print areas to print the print data to complete the image; wherein the print heads perform the main scans over each of the print areas at different print densities.

According to a second aspect, the present invention provides an ink jet printing apparatus which comprises: a printing means having a plurality of print heads with a plurality of nozzle groups, each of the nozzle groups having a predetermined number of print nozzles, each of the print heads ejecting one of inks of different colors; a main scanning means for moving the printing means relative to a print medium in a main scan direction; a sub-scanning means for moving the print medium a distance equal to the nozzle group relative to the printing means in a sub-scan direction, the sub-scan direction crossing the main scan direction; and a masking means for thinning out print data to a predetermined print density and supplying the thinned out print data to the associated nozzle group, the print data representing an image to be printed on each of print areas that are moved intermittently by the sub-scanning means; wherein the plurality of different nozzle groups are main-scanned M times ($M \geq 2$) over each of the print areas to print the print data to complete the image; wherein the print heads successively execute the main scans over each of the print areas in such a way that, of the print heads adjoining in a printing order, the print head located at a front position in the printing order performs an Mth main scan with a lower print density than that of an Nth main scan ($1 \leq N < M$).

According to a third aspect, the present invention provides an ink jet printing apparatus which comprises: a printing means having a plurality of print heads with a plurality of nozzle groups, each of the nozzle groups having a predetermined number of print nozzles, each of the print heads ejecting one of inks of different colors; a main scanning means for moving the printing means relative to a print medium in a main scan direction; a sub-scanning means for moving the print medium a distance equal to the nozzle group relative to the printing means in a sub-scan direction, the sub-scan direction crossing the main scan direction; and a masking means for thinning out print data to a predetermined print density and supplying the thinned out print data to the associated nozzle group, the print data representing an image to be printed on each of print areas that are moved intermittently by the sub-scanning means; wherein the plurality of different nozzle groups are main-scanned M times ($M \geq 2$) over each of the print areas to print the print data to complete the image; wherein the print heads successively execute the main scans over each of the print areas in such a way that, of the print heads adjoining in a printing order, the print head located at a rear position in the printing order performs a first main scan with a lower print density than that of an nth main scan ($1 < n \leq M$).

According to a fourth aspect, the present invention provides an ink jet printing apparatus which comprises: a printing means having a plurality of print heads with a plurality of nozzle groups, each of the nozzle groups having a predetermined number of print nozzles, each of the print heads ejecting one of inks of different colors; a main scanning means for moving the printing means relative to a print medium in a main scan direction; a sub-scanning means for moving the print medium a distance equal to the nozzle group relative to the printing means in a sub-scan direction, the sub-scan direction crossing the main scan direction; and a masking means for thinning out print data to a predetermined print density and supplying the thinned out print data to the associated nozzle group, the print data representing an image to be printed on each of print areas that are moved intermittently by the sub-scanning means; wherein the plurality of different nozzle groups are main-scanned M times ($M \geq 2$) over each of the print areas to print the print data to complete the image; wherein the print heads successively execute the main scans over each of the print areas in such a way that, of the print heads adjoining in a printing order, the print head located at a front position in the printing order performs an Mth main scan with a lower print density than that of an Nth main scan ($1 \leq N < M$) and the print head located at a rear position in the printing order performs a first main scan with a lower print density than that of an nth main scan ($1 < n \leq M$).

According to a fifth aspect, the present invention provides an ink jet printing apparatus which comprises: a printing means having a first and a second print head with a plurality of nozzle groups, each of the nozzle groups having a predetermined number of print nozzles, each of the print heads ejecting one of inks of different colors; a main scanning means for moving the printing means relative to a print medium in a main scan direction; a sub-scanning means for moving the print medium a distance equal to the nozzle group relative to the printing means in a sub-scan direction, the sub-scan direction crossing the main scan direction; and a masking means for thinning out print data to a predetermined print density and supplying the thinned out print data to the associated nozzle group, the print data representing an image to be printed on each of print areas that are moved intermittently by the sub-scanning means; wherein the plurality of different nozzle groups are main-scanned M times ($M \geq 2$) over each of the print areas to print the print data to complete the image; wherein the first and second print heads successively execute the main scans over each of the print areas in such a way that, of the first and second print heads, the first print head located at a front position in a printing order performs an Mth main scan with a lower print density than that of an Nth main scan ($1 \leq N < M$).

According to a sixth aspect, the present invention provides an ink jet printing apparatus which comprises: a printing means having a first and a second print head with a plurality of nozzle groups, each of the nozzle groups having a predetermined number of print nozzles, each of the print heads ejecting one of inks of different colors; a main scanning means for moving the printing means relative to a print medium in a main scan direction; a sub-scanning means for moving the print medium a distance equal to the nozzle group relative to the printing means in a sub-scan direction, the sub-scan direction crossing the main scan direction; and a masking means for thinning out print data to a predetermined print density and supplying the thinned out print data to the associated nozzle group, the print data representing an image to be printed on each of print areas that are moved intermittently by the sub-scanning means; wherein the plurality of different nozzle groups are main-scanned M times ($M \geq 2$) over each of the print areas to print the print data to complete the image; wherein the first and second print heads successively execute the main scans over each of the print areas in such a way that, of the first and second print heads, the second print head located at a rear position in a printing order performs a first main scan with a lower print density than that of an nth main scan ($1<n\leq M$).

According to a seventh aspect, the present invention provides an ink jet printing apparatus which comprises: a printing means having a first and a second print head with a plurality of nozzle groups, each of the nozzle groups having a predetermined number of print nozzles, each of the print heads ejecting one of inks of different colors; a main scanning means for moving the printing means relative to a print medium in a main scan direction; a sub-scanning means for moving the print medium a distance equal to the nozzle group relative to the printing means in a sub-scan direction, the sub-scan direction crossing the main scan direction; and a masking means for thinning out print data to a predetermined print density and supplying the thinned out print data to the assocaited nozzle group, the print data representing an image to be printed on each of print areas that are moved intermittently by the sub-scanning means; wherein the plurality of different nozzle groups are main-scanned M times ($M\geq 2$) over each of the print areas to print the print data to complete the image; wherein the first and second print heads successively execute the main scans over each of the print areas in such a way that, of the first and second print heads, the first print head located at a front position in a printing order performs an Mth main scan with a lower print density than that of an Nth main scan ($1\leq N<M$) and the second print head located at a rear position in a printing order performs a first main scan with a lower print density than that of an nth main scan ($1<n\leq M$).

According to an eighth aspect, the present invention provides an ink jet printing method using an ink jet printing apparatus, the ink jet printing apparatus comprising: a printing means having a plurality of print heads with a plurality of nozzle groups, each of the nozzle groups having a predetermined number of print nozzles, each of the print heads ejecting one of inks of different colors; a main scanning means for moving the printing means relative to a print medium in a main scan direction; a sub-scanning means for moving the print medium a distance equal to the nozzle group relative to the printing means in a sub-scan direction, the sub-scan direction crossing the main scan direction; and a masking means for thinning out print data to a predetermined print density and supplying the thinned out print data to the assocaited nozzle group, the print data representing an image to be printed on each of print areas that are moved intermittently by the sub-scanning means; wherein the plurality of different nozzle groups are main-scanned M times ($M\geq 2$) over each of the print areas to print the print data to complete the image; wherein the print heads perform the main scans over each of the print areas at different print densities.

According to a ninth aspect, the present invention provides an ink jet printing method using an ink jet printing apparatus, the ink jet printing apparatus comprising: a printing means having a plurality of print heads with a plurality of nozzle groups, each of the nozzle groups having a predetermined number of print nozzles, each of the print heads ejecting one of inks of different colors; a main scanning means for moving the printing means relative to a print medium in a main scan direction; a sub-scanning means for moving the print medium a distance equal to the nozzle group relative to the printing means in a sub-scan direction, the sub-scan direction crossing the main scan direction; and a masking means for thinning out print data to a predetermined print density and supplying the thinned out print data to the associated nozzle group, the print data representing an image to be printed on each of print areas that are moved intermittently by the sub-scanning means; wherein the plurality of different nozzle groups are main-scanned M times ($M\geq 2$) over each of the print areas to print the print data to complete the image; wherein the print heads successively execute the main scans over each of the print areas in such a way that, of the print heads adjoining in a printing order, the print head located at a front position in the printing order performs an Mth main scan with a lower print density than that of an Nth main scan ($1\leq N<M$).

According to a tenth aspect, the present invention provides an ink jet printing method using an ink jet printing apparatus, the ink jet printing apparatus comprising: a printing means having a plurality of print heads with a plurality of nozzle groups, each of the nozzle groups having a predetermined number of print nozzles, each of the print heads ejecting one of inks of different colors; a main scanning means for moving the printing means relative to a print medium in a main scan direction; a sub-scanning means for moving the print medium a distance equal to the nozzle group relative to the printing means in a sub-scan direction, the sub-scan direction crossing the main scan direction; and a masking means for thinning out print data to a predetermined print density and supplying the thinned out print data to the associated nozzle group, the print data representing an image to be printed on each of print areas that are moved intermittently by the sub-scanning means; wherein the plurality of different nozzle groups are main-scanned M times ($M\geq 2$) over each of the print areas to print the print data to complete the image; wherein the print heads successively execute the main scans over each of the print areas in such a way that, of the print heads adjoining in a printing order, the print head located at a front position in the printing order performs an Mth main scan with a lower print density than that of an Nth main scan ($1\leq N<M$) and the print head located at a rear position in the printing order performs a first main scan with a lower print density than that of an nth main scan ($1<n\leq M$).

According to an eleventh aspect, the present invention provides a printing method in an ink jet printing apparatus, the ink jet printing apparatus including: a printing means having a plurality of print heads with a plurality of nozzle groups, each of the nozzle groups having a predetermined number of print nozzles, each of the print heads ejecting one of inks of different colors; a main scanning means for moving the printing means relative to a print medium in a main scan direction; and a sub-scanning means for moving the print medium a distance equal to the nozzle group relative to the printing means in a sub-scan direction, the sub-scan direction crossing the main scan direction; wherein the ink jet printing apparatus performs printing based on print data supplied from an externally connected host device; the printing method comprising the steps of: thinning out the print data to a predetermined print density by the host device, the print data representing an image to be printed on associated one of print areas that are moved intermittently by the sub-scanning means; sending the thinned out print data from the host device to the ink jet printing apparatus; supplying the thinned out print data to the associated nozzle group; and main-scanning the plurality of different nozzle groups M times ($M\geq 2$) over each of the print areas to print the print data to complete the image; wherein the print heads perform the main scans over each of the print areas at different print densities.

As described above, in the ink jet printing apparatus of this invention that ejects inks of different colors from at least two print heads to print an image, a so-called multi-pass printing can be performed in such a way as to reduce color mixing due to bleeding of inks of different colors and enable high-speed printing of a high-quality image, without increasing the number of passes.

The above and other objects, effects, features and advantages of the present invention will become more apparent from the following description of embodiments thereof taken in conjunction with the accompanying drawings.

DETAILED DESCRIPTION OF PREFERRED EMBODIMENTS

Now, embodiments of the present invention will be described in detail by referring to the accompanying drawings.

Figure 1:
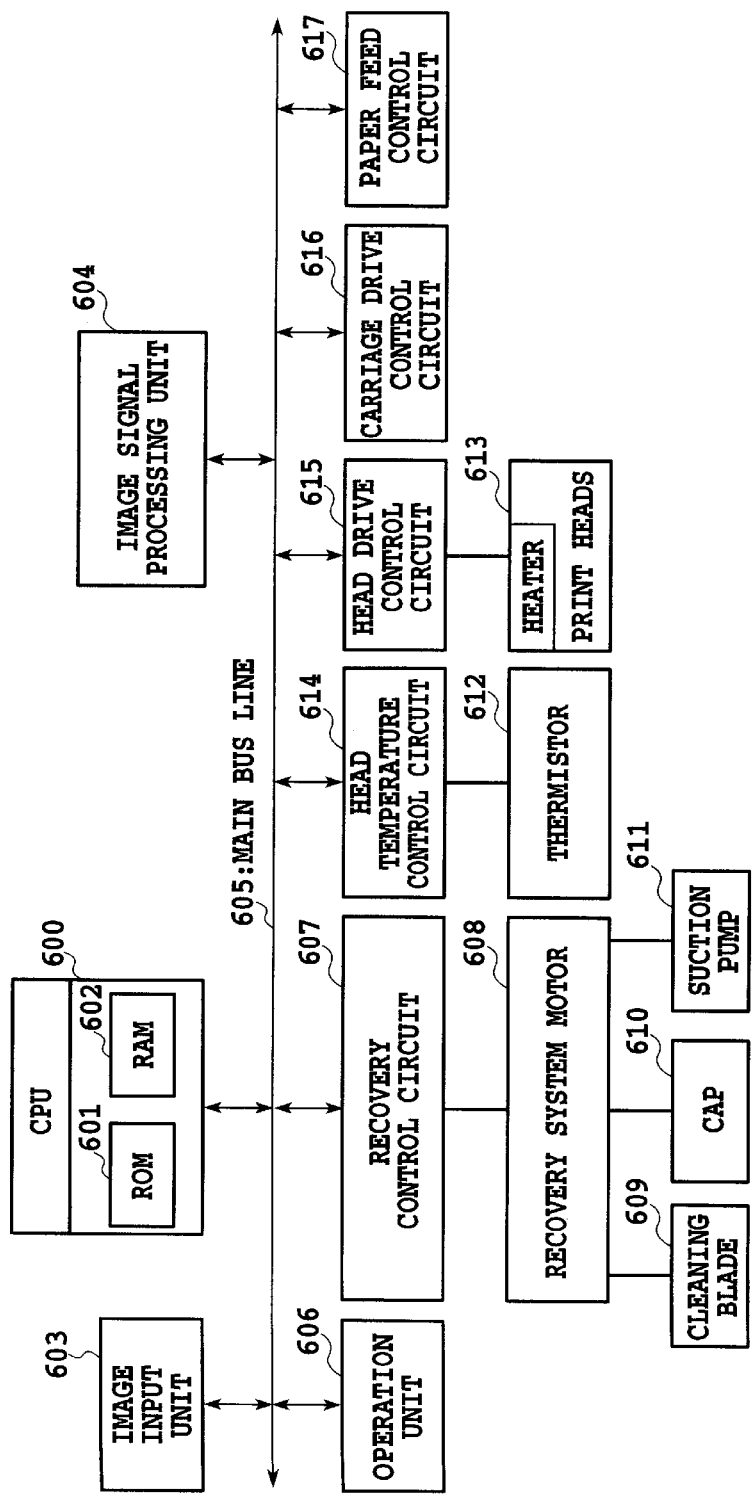
FIG. 1 is a block diagram showing a configuration of a control system in an embodiment of the ink jet printing apparatus according to the present invention.
Figure 10:
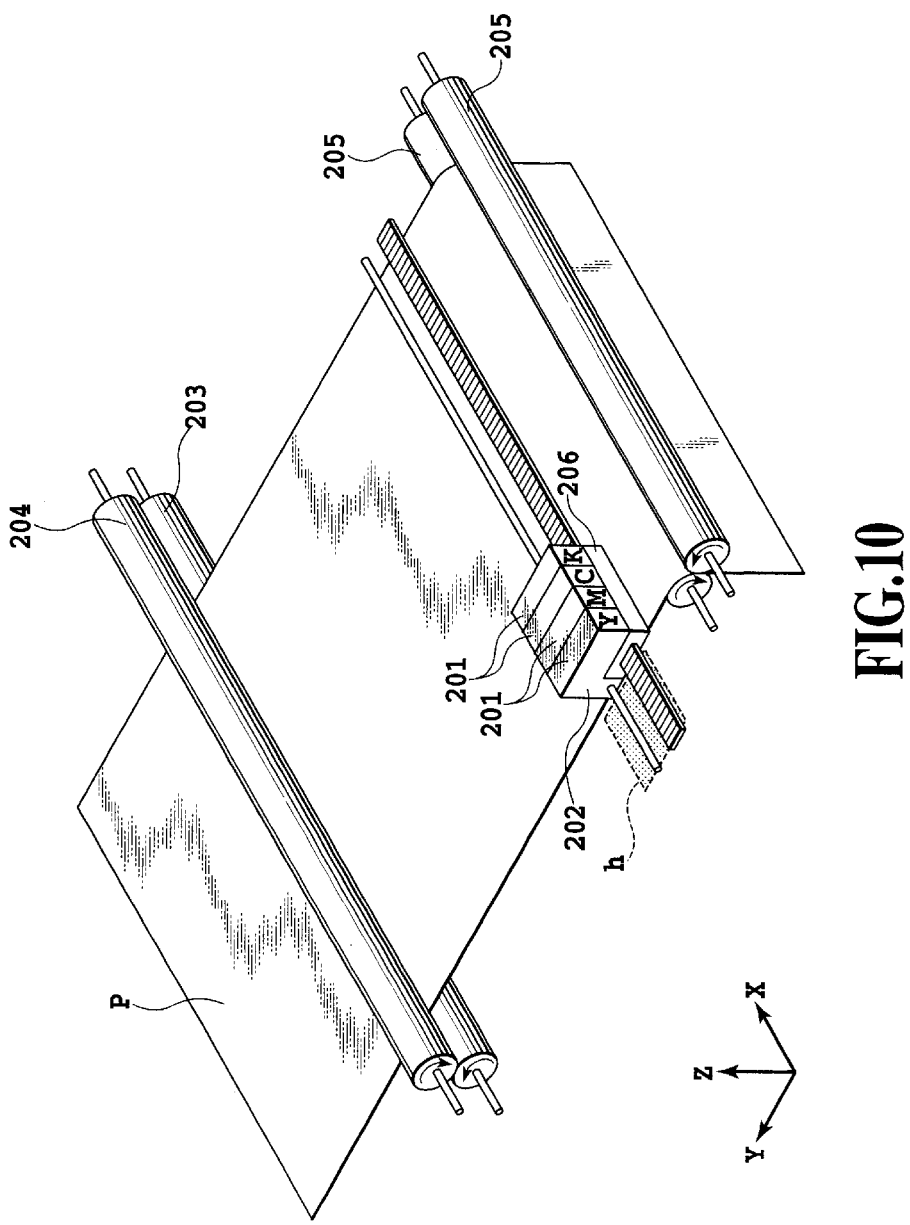
FIG. 10 is a perspective view showing an outline construction of a mechanism of the conventional ink jet printing apparatus.

FIG. 1 is a block diagram showing a configuration of a control system in an ink jet printing apparatus according to one embodiment of the present invention. The mechanical construction of the ink jet printing apparatus of this embodiment is identical to that shown in FIG. 10.

In FIG. 1, a CPU 600 executes control and data processing for various circuits via a main bus line 605. That is, the CPU 600, according to a program stored in ROM 601, performs control and data processing for various circuits described later, such as a head drive control circuit 615 and a carriage drive control circuit 616.

A RAM 602 is used as a work area for the data processing by the CPU 600. Storage devices other than RAM 602 include a hard disk not shown. An image input unit 603 has an interface with a host and temporarily holds an image entered from the host. An image signal processing unit 604 performs a color conversion, a binarization, and data processing for a print operation shown in FIG. 6 and subsequent figures.

An operation unit 606 has keys and others by which an operator enters control inputs. A recovery control circuit 607 controls recovery operations such as preliminary ink ejections according to a recovery processing program stored in the RAM 602. That is, a recovery system motor 608 drives print head 613 and also a cleaning blade 609, a cap 610 and a suction pump 611 for removing dirt from the surfaces of the print heads.

The head drive control circuit 615 controls the operation of ink ejection electrothermal transducers in the print head 613 to cause the print heads 613 to perform preliminary ejections and ink ejections. Further, a carriage drive control circuit 616 and a paper feed control circuit 617, according to the program, control the movement of the carriage and the paper feeding.

On a substrate of the print head 613 that is provided with the ink ejection electrothermal transducers, there is a warming heater to heat the ink in the print head to a desired temperature. A thermistor 612 is also provided on the substrate to measure virtually the temperature of the ink in the print head. The thermistor 612 may be provided externally or around the print head, rather than on the substrate.

Based on the construction described above, first to third embodiments of the invention will be explained in the following.

(First Embodiment)

Now, a first embodiment of this invention will be described.

Figure 9:
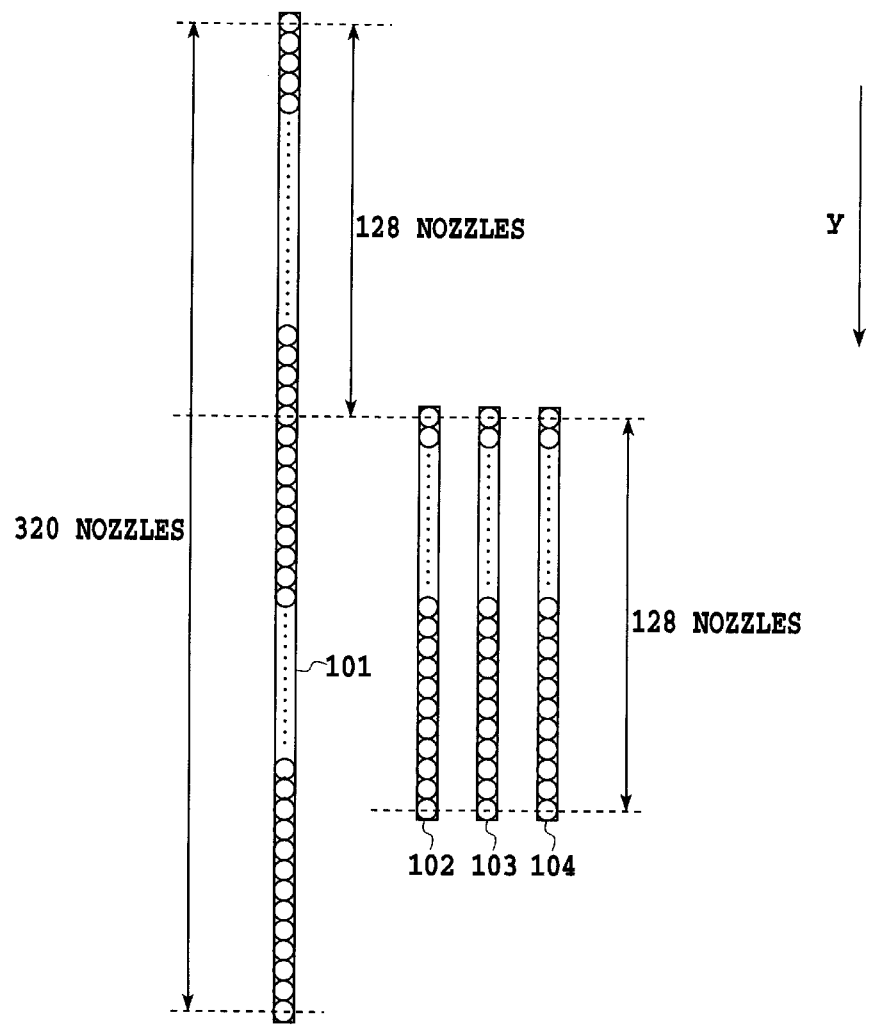
FIG. 9 is a schematic diagram showing a nozzle arrangement of the print heads in a conventional ink jet printing apparatus.

The print head used in the first embodiment has the same nozzle arrangement as that shown in FIG. 9 and the construction of each nozzle is the same as the conventional one. In this first embodiment, a so-called 2-pass printing is performed which completes an image by performing two main scans (passes) over the same print area. This is similar to the one used in the conventional technology. The first embodiment, however, differs from the conventional technology in that the masks (mask means) used in thinning out the image data in each pass have different print densities.

Figure 2:
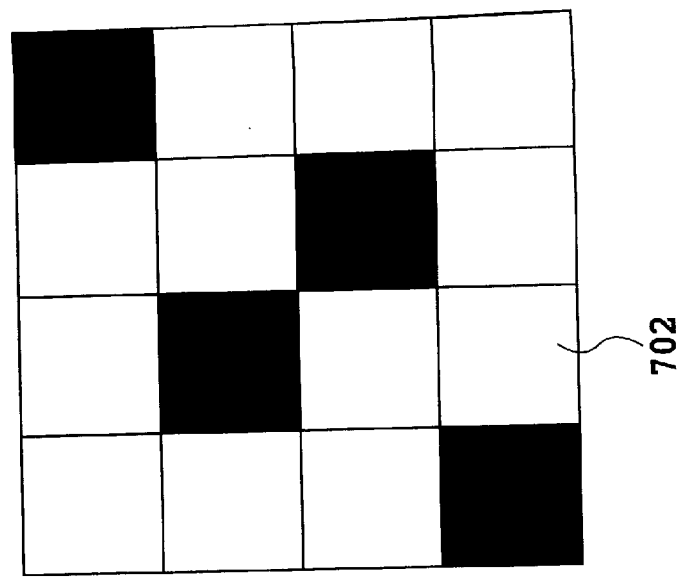
FIG. 2 is a diagram showing mask patterns used in a 2-pass print mode according to a first embodiment of the invention.
Figure 2:
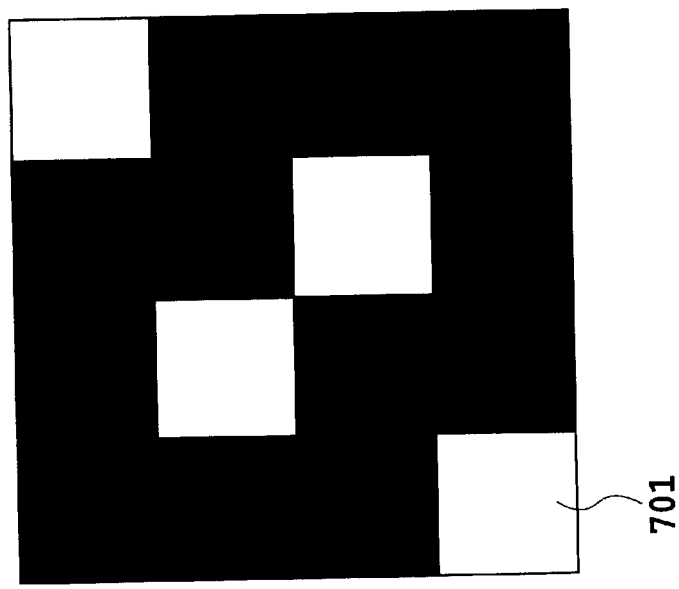

FIG. 2 shows print masks used in the first embodiment.

In FIG. 2, denoted 701 is a mask pattern for the first pass of the black print head and for the second pass of the color print head. This mask pattern has a size of 4×4 pixels with a print density of 75%. Denoted 702 is a mask pattern for the second pass of the black print head and for the first pass of the color print head. This mask pattern has a size of 4×4 pixels with a print density of 25%. The mask patterns 701 and 702 are complementary to each other.

Figure 3:
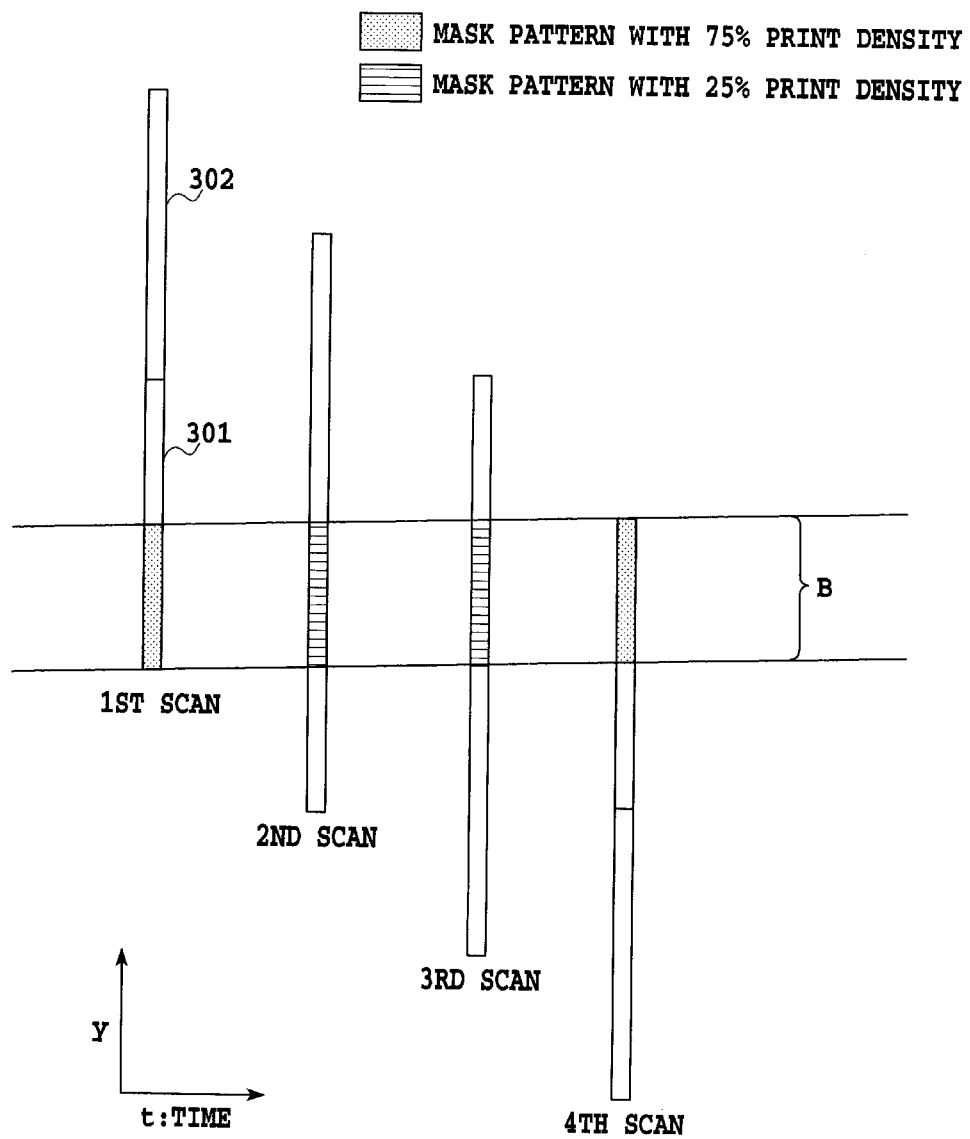
FIG. 3 is a schematic diagram showing a print operation performed in the 2-pass print mode according to the first embodiment of the invention.

FIG. 3 schematically illustrates the print operation using the print masks for the 2-pass print mode of the first embodiment.

Figure 11:
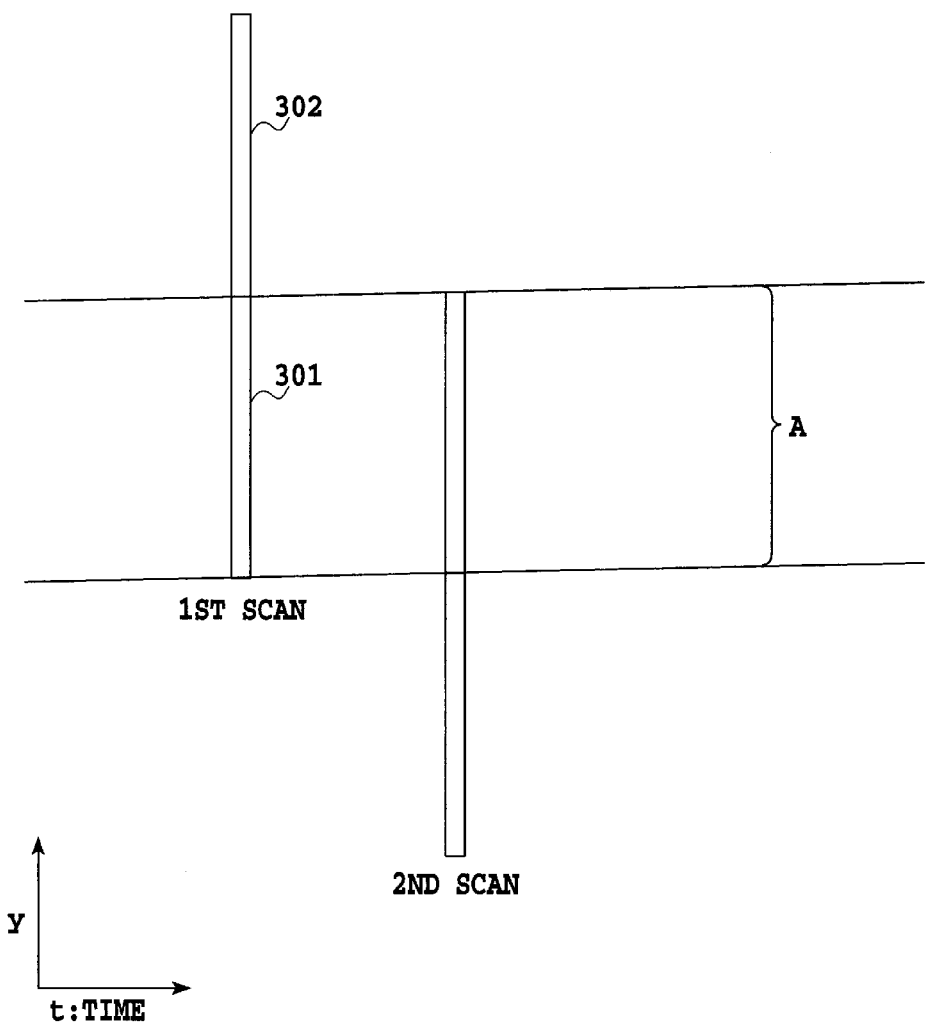
FIG. 11 is a schematic diagram showing a print operation performed in a 1-pass print mode in the conventional ink jet printing apparatus.
Figure 12:
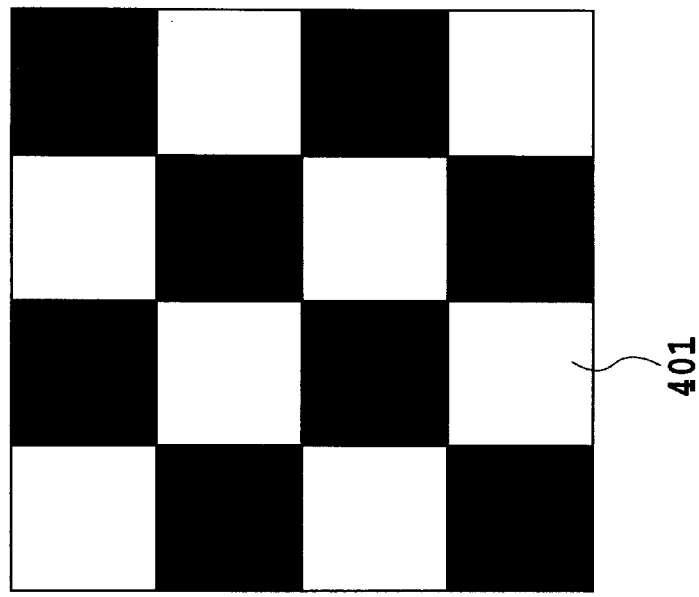
FIG. 12 is a schematic diagram showing mask patterns used in a 2-pass print mode in the conventional ink jet printing apparatus.
Figure 12:
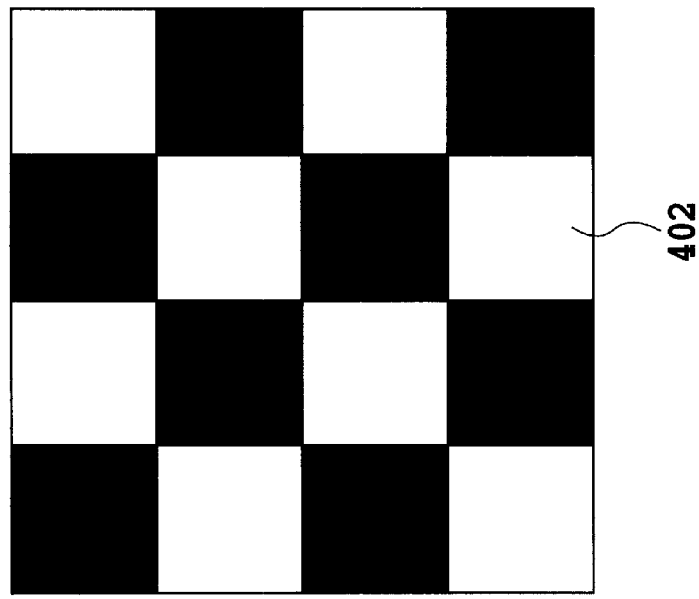
Figure 13:
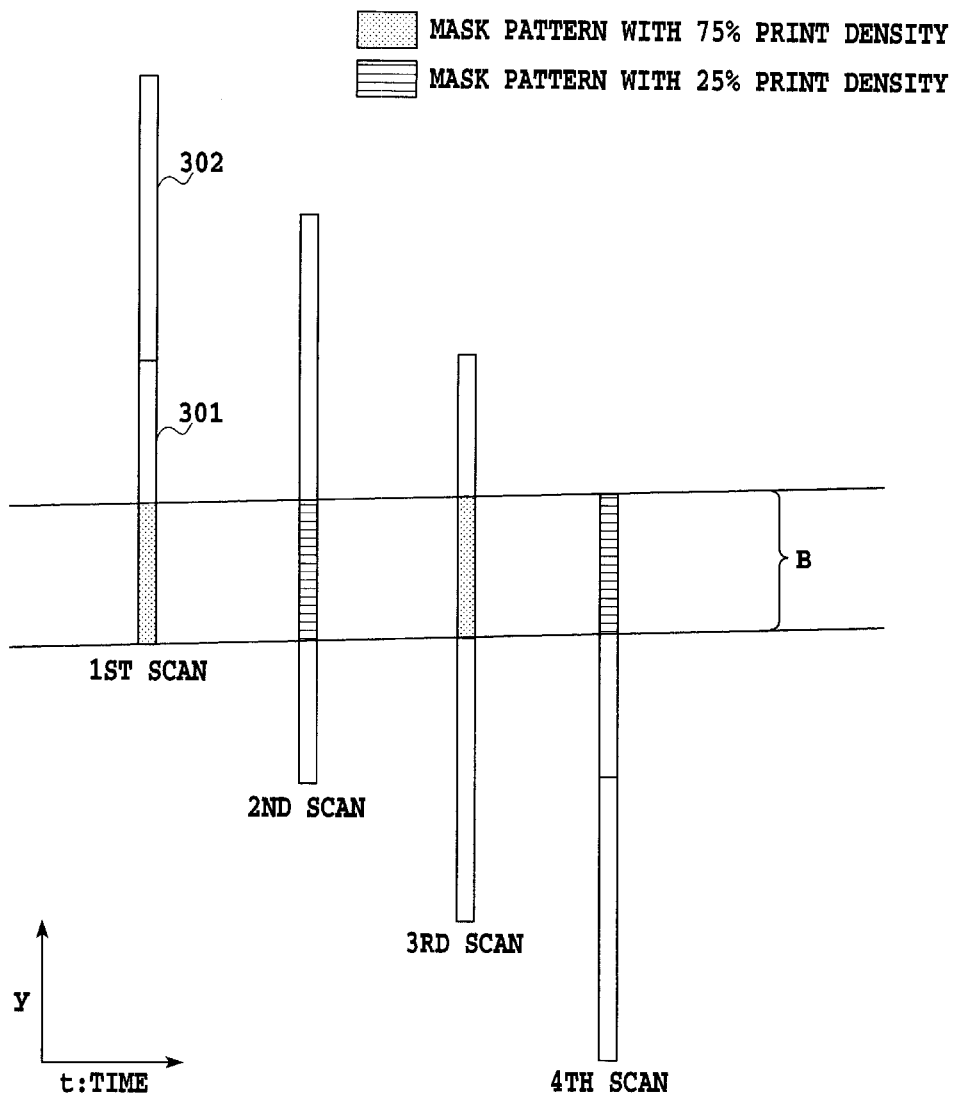
FIG. 13 is a schematic diagram showing a print operation performed in the 2-pass print mode in the conventional ink jet printing apparatus.

In FIG. 3 reference numbers 301 and 302 represent black and color print heads, respectively, as in FIG. 11. In the first to the fourth scan in the figure, the time intervals between the adjoining scans are all T (one scan period). The print area B has a length in the Y direction equal to 64 nozzles as in FIG. 13.

In the first scan, the black print head 301 prints the print area B with the print data that is thinned out by the mask pattern with a 75% print density (in the first pass of the black print head). After this, the print paper is fed a 64-nozzle distance in the Y direction.

In the second scan, the black print head 301 prints the print area B with the print data that is thinned out by the mask pattern with a 25% print density (in the second pass of the black print head) to complete an image of black ink. Then, the print paper is fed a 64-nozzle distance in the Y direction.

In the third scan, the color print head 302 prints the print area B using the 25% mask pattern (in the first pass of the color print head). This is followed by feeding the print paper a 64-nozzle distance in Y direction.

Then in the fourth scan, the color print head 302 prints the print area B using the 75% mask pattern (in the second pass of the color print head), thus printing all print data on the print area B to complete an image.

In the print operation described above, when the black print area and the color print area adjoin each other, there is a time interval of 2T from when the black ink is printed with a 75% print density in the first scan (first pass of the black ink) until the color ink adjoining the black ink is printed in the third scan (first pass of the color ink). Hence, there is a sufficient time for the black ink to soak into the print paper and be fixed there before the color ink is applied. Further, the print density of the third scan is 25%, which means that the amount of color ink that lands on the print paper is reduced to one-half that of the conventional 2-pass mask patterns (the conventional mask patterns have a print density of 50% in both the first and second passes). Hence, the possibility of the black ink printed in the first scan and the color ink printed in the third scan mixing together due to ink bleeding can be reduced significantly.

Further, the black ink printed in the second scan (second pass of the black ink) and the color ink printed in the third scan (first pass of the color ink) both have the print density of 25% and thus the amounts of inks that land on the paper are smaller than those when the conventional 2-pass mask patterns are used (the conventional mask patterns have a print density of 50% in both the first and second passes). Thus, the ink bleeding from these two scans is reduced, substantially reducing the possibility of color mixing and contributing to an improved image quality.

The present invention is not limited to the mask patterns with the above-described print densities but may appropriately select print densities for the mask patterns according to the kind of inks used, the properties of black ink and color ink, and the kind of print medium.

Figure 4:
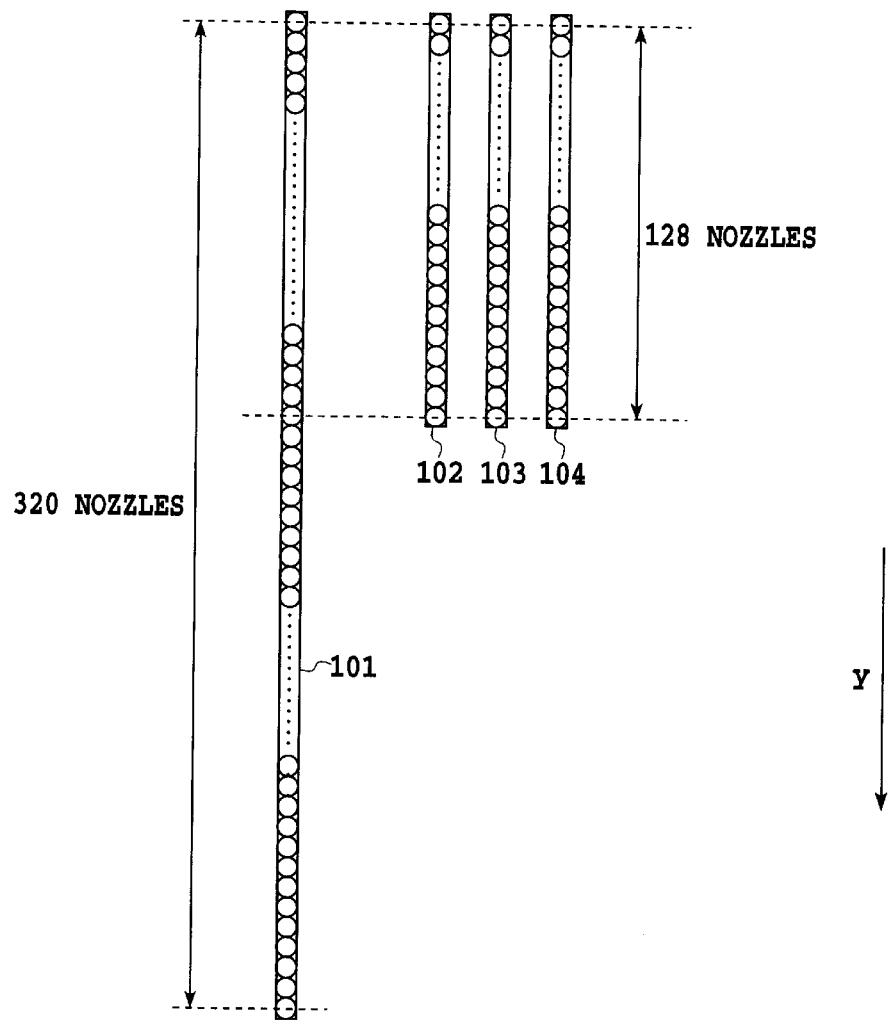
FIG. 4 is a schematic diagram showing a nozzle arrangement of other print heads that can be used in the first embodiment of the invention.

Further, while in this embodiment the black ink print head starts the printing operation first, followed by the color ink print head, the print masks described above can cope with print heads that start printing with the black nozzles and the color nozzles at the same time, as shown in FIG. 4.

In FIG. 4, reference numbers 101–104 represent similar print heads to those of FIG. 9. The number of nozzles in each of the black print head and the color print heads used in the color mode is 128 nozzles, as in the conventional print heads. It should be noted, however, that both the black print head and the color print heads are arranged such that their rearmost end nozzles in the direction of paper feed are situated at the same positions.

In the arrangement in which the black ink print head and the color ink print heads are arrayed in the same position with respect to the sub-scan direction (side-by-side arrangement), the same effects as those of the above embodiment can be produced in the following cases.

That is, when in FIG. 4 a 2-pass printing is performed by using 128 color nozzles and black nozzles arranged by the side of the color nozzles, the front side 64 nozzles on both the black and the color print heads are used for the first pass and the rear 64 nozzles for the second pass. In this case, with the conventional method, because the print densities of the mask patterns for the first and second passes are both 50% and because the black and color inks are printed in the same scan, the mixing of the black ink and the color ink due to ink bleeding easily results.

With the embodiment of this invention, on the other hand, because the mask patterns for the first pass and the second pass have different print densities, a high quality image can be obtained.

For example, consider a case where in the black ink printing the print density of the mask pattern for the first pass is 99% and that for the second pass is 1%, and where in the color ink printing the print density of the mask pattern for the first pass is 1% and that for the second pass is 99%. The color ink printed in the first pass simultaneously with the black ink is 1% and the black ink printed in the second pass simultaneously with the color ink is 1%. That is, 99% black ink and 99% color ink are printed with one main scan time interposed in between, so the possibility of the two inks mixing together due to the bleeding of inks is significantly reduced, thus forming an image with high quality.

In the first embodiment as described above, the black ink that is printed prior to or simultaneously with the color ink over the same print area has a print density for the first pass set higher than that for the second pass and the color ink has a print density for the first pass set lower than that for the second pass. This arrangement can reduce the mixing of inks of different colors due to ink bleeding, making it possible to produce a high quality image at high speed without increasing the number of passes.

(Second Embodiment)

Next, a second embodiment of the present invention will be described.

In the first embodiment a 2-pass print mode was taken for example. In the second embodiment the present invention is applied to a 3-pass print mode (consisting of three main scans).

The nozzle arrangement of the print heads used in the second embodiment is similar to that shown in FIG. 11. That is, in the color mode the black print head 301 uses 126 nozzles ranging from a third nozzle from the top end in the figure to a 128th nozzle. The color print head 302 uses 126 nozzles from a first nozzle at the top end to a 126th nozzle. In this embodiment, too, the mechanical construction of the ink jet printing apparatus is similar to that shown in FIG. 10.

Figure 5:
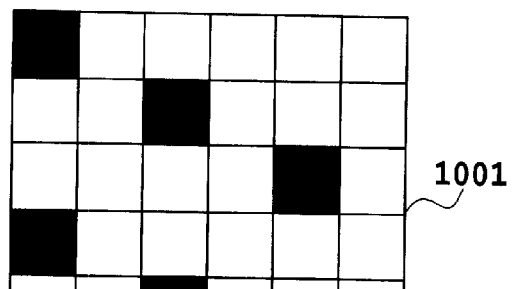
FIG. 5 is a schematic diagram showing mask patterns in a 3-pass print mode according to a second embodiment of the invention.
Figure 5:
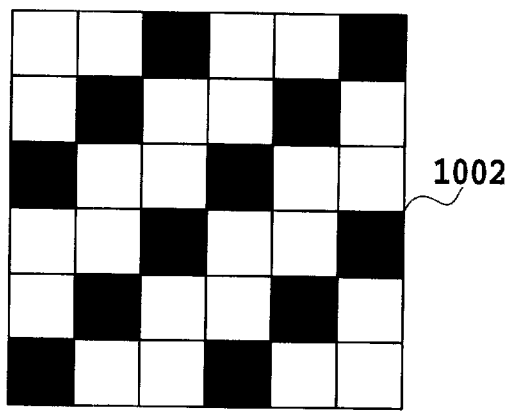
Figure 5:
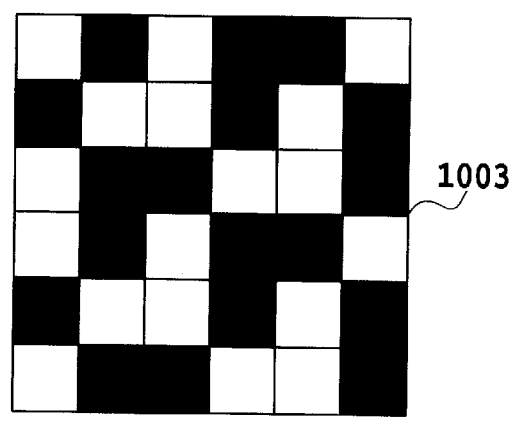

FIG. 5 shows print masks (mask means) for the 3-pass print mode used in this embodiment.

In FIG. 5, reference number 1001 represents a mask pattern used for a third pass of the black print head 301 and for a first pass of the color print head 302. This mask pattern 1001 has a size of 6×6 pixels and produces a ⅙ print density. Reference number 1002 represents a mask pattern used for a second pass of the black print head 301 and for a second pass of the color print head 302. This mask pattern 1002 has a size of 6×6 pixels and produces a ⅓ print density.

Reference number 1003 represents a mask pattern used for a first pass of the black print head 301 and for a third pass of the color print head 302. This mask pattern 1003 has a size of 6×6 pixels and produces a ½ print density. These mask patterns 1001, 1002, 1003 are complementary to each other.

Figure 6:
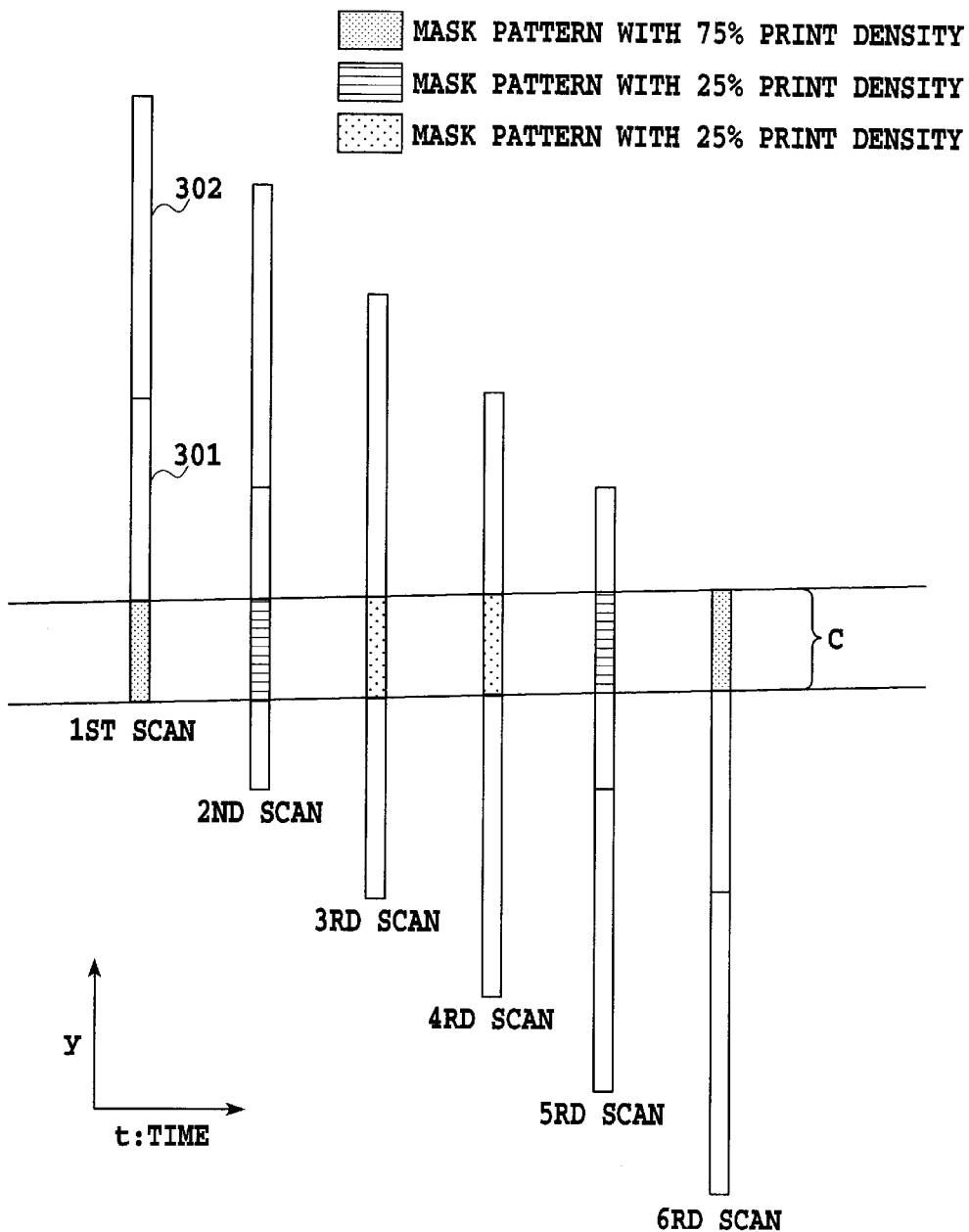
FIG. 6 is a schematic diagram showing a print operation performed in the 3-pass print mode according to the second embodiment of the invention.

FIG. 6 is a schematic diagram showing the printing method of the second embodiment using the print masks described above.

In FIG. 6, 301 and 302 indicate a black print head and a color print head, as in the case of FIG. 3. In the first to sixth scans in the figure, the time intervals between the adjoining scans are all T. The print area C is 42 nozzles wide in the Y direction.

In the first scan, the black print head 301 prints the print area C using the mask pattern 1003 with a ½ print density (first pass of the black print head). This is followed by the print paper being fed a 42-nozzle distance in the Y direction.

In the second scan, the black print head 301 prints the print area C using the mask pattern 1002 with a ⅓ print density (second pass of the black print head). Then, the print paper is fed a 42-nozzle distance in the Y direction.

In the third scan, the black print head 301 prints the print area C using the mask pattern 1001 with a ⅙ print density (third pass of the black print head) to complete a black ink image. Then, the print paper is fed a 42-nozzle distance in the Y direction.

In the fourth scan, the color print head 302 prints the print area C using the mask pattern 1001 with a ⅙ print density (first pass of the color print head). This is followed by the print paper being fed a 42-nozzle distance in the Y direction.

In the fifth scan, the color print head 302 prints the print area C using the mask pattern 1002 with a ⅓ print density (second pass of the color print head). This is followed by the print paper being fed a 42-nozzle distance in the Y direction.

In the sixth scan, the color print head 302 prints the print area C using the mask pattern 1003 with a ½ print density (third pass of the color print head) to complete the entire image in the print area C.

When the black print area and the color print area adjoin each other, there is a time interval of 3T from when the black ink is printed with a ½ print density in the first scan (first pass of the black ink) until the color ink adjoining the black ink is printed in the fourth scan (first pass of the color ink). During this time interval of 3T, the black ink soaks well into the print paper and is fixed. Further, the print density of the fourth scan is ⅙, which means that the amount of color ink that lands on the print paper is reduced to one-half that when the conventional 3-pass mask patterns are used (the conventional mask patterns for the black ink and color ink print heads have a ⅓ print density in the first to third passes). Hence, the possibility of the black ink printed in the first scan and the color ink printed in the fourth scan mixing together due to ink bleeding can be reduced significantly.

Further, the black ink printed in the third scan (third pass for the black ink) and the color ink printed in the fourth scan (first pass for the color ink) both have a print density of ⅙. Hence, the amounts of black and color inks that land on the print paper are reduced to one-half those produced by the conventional 3-pass mask patterns (which for the black ink and color ink print heads have a ⅓ print density in the first to third passes). This reduces the ink bleeding during these two scans and thus the possibility of the ink mixing is also reduced significantly, contributing to forming a high quality image.

In this second embodiment, the print densities of the mask patterns are not limited to the above-described densities but may take any appropriate values depending on the kinds of inks used, the properties of black ink and color ink, and the kind of print medium.

Further, although in the print heads described above the black print head starts printing prior to the color print head, the print masks of this embodiment, like those of the first embodiment, can also be applied to the print heads that start printing the black ink and the color ink in the same scan.

In the second embodiment, as described above, when the black ink is printed prior to or simultaneously with the color ink over the same print area, the first pass uses a higher print density than the second and third passes. The second embodiment is also arranged to print the color ink with a lower print density in the first pass than in the second and third passes. This can reduce the mixing of inks of different colors due to ink bleeding, thus making it possible to produce a high quality image at high speed without increasing the number of passes.

(Third Embodiment)

In the first and second embodiments we have described a case where the black print head 301 starts printing on the print paper prior to or simultaneously with the color print head 302. In the third embodiment, on the other hand, the color print head 302 starts printing on the print paper before the black print head 301. Here, a 2-pass print mode is taken for example.

Figure 7:
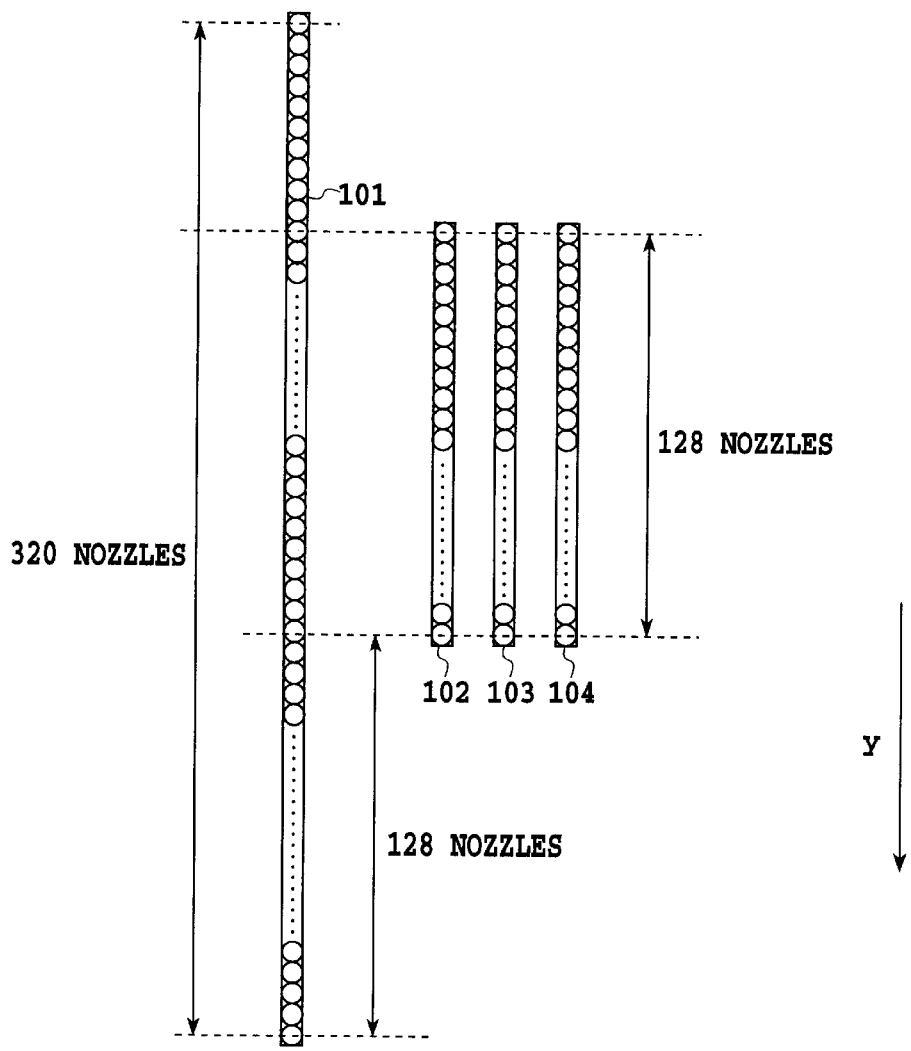
FIG. 7 is a schematic diagram showing a nozzle arrangement of the print heads according to the second embodiment of the invention.

FIG. 7 shows print heads used in the third embodiment. In the figure reference numbers 101–104 are identical to those shown in FIG. 9.

In a color mode, the black head uses 128 nozzles ranging from a lower end nozzle to a 128th nozzle from the bottom in the figure and the color print head uses all 128 nozzles. The black nozzles used in the color mode are staggered a 128-nozzle distance from the color nozzles in the paper feed direction.

Mask patterns used in the 2-pass print mode according to the third embodiment are similar to those shown in FIG. 2.

By referring to a schematic diagram of FIG. 8, the 2-pass print mode of the third embodiment will be explained.

Figure 8:
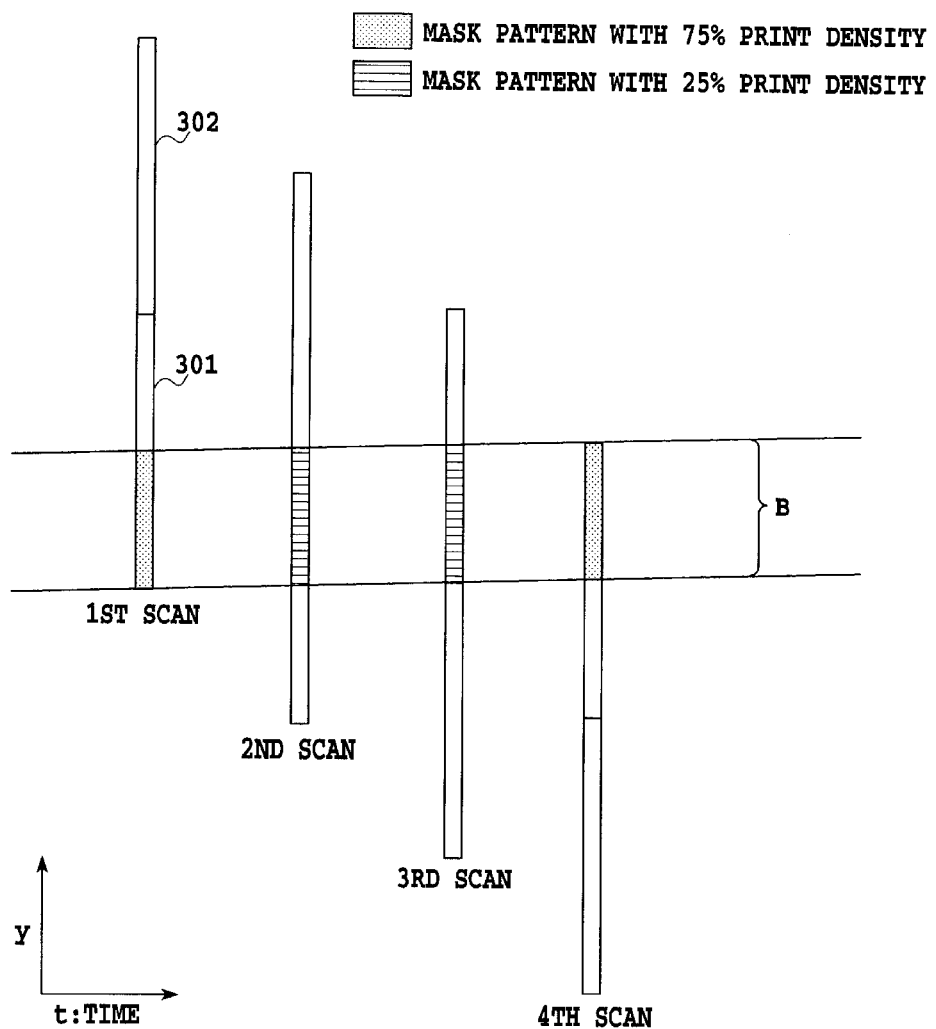
FIG. 8 is a schematic diagram showing a print operation performed in a 2-pass print mode according to a third embodiment of the invention.

In FIG. 8, 301 and 303 represent a black ink print head and a color ink print head, respectively, as in the case of FIG. 3. In the third embodiment, however, the color print head 302 is situated at the front and the black print head 301 at the rear with respect to the paper feed direction Y, i.e., the color and black print heads are arranged in the order opposite that shown in FIG. 3.

In the first to fourth scans in the figure, the time intervals between the adjoining scans are all T (one scan period). A print area B is 64 nozzles wide in the Y direction.

In the first scan, the color print head 302 prints the print area B using a mask pattern with a print density of 75%. This is followed by feeding the print paper a 64-nozzle distance in the Y direction.

In the second scan, the color print head 302 prints the print area B using a mask pattern with a print density of 25%. This is followed by feeding the print paper a 64-nozzle distance in the Y direction.

In the third scan, the black print head 301 prints the print area B using the mask pattern with a print density of 25%. This is followed by feeding the print paper a 64-nozzle distance in the Y direction.

In the fourth scan, the black print head 301 prints the print area B using the mask pattern with a print density of 75%, thus completing all printing operations in the print area B.

When the black print area and the color print area adjoin each other, there is a time interval of 2T from when the color ink is printed with a 75% print density in the first scan until the black ink adjoining the color ink is printed in the third scan. This time interval allows the color ink to soak well into the print paper and be fixed there. Further, the print density of the black ink printed in the third scan is 25% and thus the amount of black ink ejected onto the print paper is smaller than when the conventional 2-pass mask patterns are used (which have a print density of 50% both in the first and second passes), thus minimizing the ink bleeding. This in turn significantly reduces the possibility of the black ink and the color ink mixing together due to ink bleeding.

Further, the print density of the color ink printed in the second scan is 25% and the print density of the black ink printed in the third scan, a time interval of T after the second scan, is also 25%. Hence, the amounts of black ink and color ink that land on the print paper are one-half those obtained when the conventional 2-pass mask patterns are used (which have a 50% print density both in the first and second passes), thus reducing the ink bleeding. This in turn minimizes the mixing of inks due to ink bleeding and provides a high quality image.

Further, in the third embodiment too, the print densities of the applied mask patterns are not limited to those shown in FIG. 2 but may selectively use appropriate print densities depending on the kinds of inks used, the properties of black ink and color ink (e.g., surface tensions of inks), and the kind of print medium.

In the third embodiment as described above, the color ink that is printed prior to the black ink over the same print area is printed with a higher density in the first pass than in the second pass. The black ink that is printed after the color ink is printed with a lower density in the first pass than in the second pass. This arrangement can reduce the mixing of different inks due to bleeding of inks, thus allowing the printing of a high quality image at high speed without increasing the number of passes.

In each of the above embodiments, two kinds of print heads (first and second print heads), a black ink print head and a color ink print head, have been described to be used as a plurality of kinds of print heads that print one after another at predetermined time intervals. It is possible to use a greater number of print heads that print sequentially one after another. For example, this invention is also applicable to a printing apparatus that uses three kinds of print heads (first, second and third print heads).

That is, when a 3-pass printing is performed using these print heads, the print density of the second pass in the printing operation of each print head is set lower than those of other passes (first and third passes). For example, the print densities for the first pass and third pass may be set at 60% and the print density for the second pass at 20%. With this arrangement, the ink mixing can be reduced between the adjoining printing operations, i.e., between the printing operations by the first and second print heads and between the printing operations by the second and third print heads.

To describe in more detail, a sufficient length of time (2T) can be taken for an ink to soak into the paper and be fixed there after an ink of one color has been printed with high density (60%) before another ink of different color is printed. In addition, the second ink of different color is printed at a low density of 20%. Because of these arrangement, it is possible to reduce the mixing of inks as in the aforementioned embodiments. Further, since in the adjoining passes performed by the different print heads the printing is done at a low print density of 20%, the ink mixing can also be reduced.

The present invention as described above can also be applied to a printing apparatus in which three or more print heads print in a sequential order.

(Others)

The present invention achieves distinct effect when applied to a recording head or a recording apparatus which has means for generating thermal energy such as electrothermal transducers or laser light, and which causes changes in ink by the thermal energy so as to eject ink. This is because such a system can achieve a high density and high resolution recording.

A typical structure and operational principle thereof is disclosed in U.S. Pat. Nos. 4,723,129 and 4,740,796, and it is preferable to use this basic principle to implement such a system. Although this system can be applied either to on-demand type or continuous type ink jet recording systems, it is particularly suitable for the on-demand type apparatus. This is because the on-demand type apparatus has electrothermal transducers, each disposed on a sheet or liquid passage that retains liquid (ink), and operates as follows: first, one or more drive signals are applied to the electrothermal transducers to cause thermal energy corresponding to recording information; second, the thermal energy induces sudden temperature rise that exceeds the nucleate boiling so as to cause the film boiling on heating portions of the recording head; and third, bubbles are grown in the liquid (ink) corresponding to the drive signals. By using the growth and collapse of the bubbles, the ink is expelled from at least one of the ink ejection orifices of the head to form one or more ink drops. The drive signal in the form of a pulse is preferable because the growth and collapse of the bubbles can be achieved instantaneously and suitably by this form of drive signal. As a drive signal in the form of a pulse, those described in U.S. Pat. Nos. 4,463,359 and 4,345,262 are preferable. In addition, it is preferable that the rate of temperature rise of the heating portions described in U.S. Pat. No. 4,313,124 be adopted to achieve better recording.

U.S. Pat. Nos. 4,558,333 and 4,459,600 disclose the following structure of a recording head, which is incorporated to the present invention: this structure includes heating portions disposed on bent portions in addition to a combination of the ejection orifices, liquid passages and the electrothermal transducers disclosed in the above patents. Moreover, the present invention can be applied to structures disclosed in Japanese Patent Application Laid-open Nos. 59-123670 (1984) and 59–138461 (1984) in order to achieve similar effects. The former discloses a structure in which a slit common to all the electrothermal transducers is used as ejection orifices of the electrothermal transducers, and the latter discloses a structure in which openings for absorbing pressure waves caused by thermal energy are formed corresponding to the ejection orifices. Thus, irrespective of the type of the recording head, the present invention can achieve recording positively and effectively.

The present invention can be also applied to a so-called full-line type recording head whose length equals the maximum length across a recording medium. Such a recording head may consists of a plurality of recording heads combined together, or one integrally arranged recording head.

In addition, the present invention can be applied to various serial type recording heads: a recording head fixed to the main assembly of a recording apparatus; a conveniently replaceable chip type recording head which, when loaded on the main assembly of a recording apparatus, is electrically connected to the main assembly, and is supplied with ink therefrom; and a cartridge type recording head integrally including an ink reservoir.

It is further preferable to add a recovery system, or a preliminary auxiliary system for a recording head as a constituent of the recording apparatus because they serve to make the effect of the present invention more reliable. Examples of the recovery system are a capping means and a cleaning means for the recording head, and a pressure or suction means for the recording head. Examples of the preliminary auxiliary system are a preliminary heating means utilizing electrothermal transducers or a combination of other heater elements and the electrothermal transducers, and a means for carrying out preliminary ejection of ink independently of the ejection for recording. These systems are effective for reliable recording.

The number and type of recording heads to be mounted on a recording apparatus can be also changed. For example, only one recording head corresponding to a single color ink, or a plurality of recording heads corresponding to a plurality of inks different in color or concentration can be used. In other words, the present invention can be effectively applied to an apparatus having at least one of the monochromatic, multi-color and full-color modes. Here, the monochromatic mode performs recording by using only one major color such as black. The multi-color mode carries out recording by using different color inks, and the full-color mode performs recording by color mixing.

Furthermore, although the above-described embodiments use liquid ink, inks that are liquid when the recording signal is applied can be used: for example, inks can be employed that solidify at a temperature lower than the room temperature and are softened or liquefied in the room temperature. This is because in the ink jet system, the ink is generally temperature adjusted in a range of 30° C.–70° C. so that the viscosity of the ink is maintained at such a value that the ink can be ejected reliably.

In addition, the present invention can be applied to such apparatus where the ink is liquefied just before the ejection by the thermal energy as follows so that the ink is expelled from the orifices in the liquid state, and then begins to solidify on hitting the recording medium, thereby preventing the ink evaporation: the ink is transformed from solid to liquid state by positively utilizing the thermal energy which would otherwise cause the temperature rise; or the ink, which is dry when left in air, is liquefied in response to the thermal energy of the recording signal. In such cases, the ink may be retained in recesses or through holes formed in a porous sheet as liquid or solid substances so that the ink faces the electrothermal transducers as described in Japanese Patent Application Laid-open Nos. 54–56847 (1979) or 60–71260 (1985). The present invention is most effective when it uses the film boiling phenomenon to expel the ink.

Furthermore, the ink jet recording apparatus of the present invention can be employed not only as an image output terminal of an information processing device such as a computer, but also as an output device of a copying machine including a reader, and as an output device of a facsimile apparatus having a transmission and receiving function.

Furthermore, although in the foregoing embodiments the print data thinning out operation has been described to be performed by the printing apparatus body, it may be done by other than the printing apparatus body, for example, by a personal computer. If this method is applied to the printing operation of FIG. 3 associated with the first embodiment, the print data for the first pass over the print area B is thinned out in advance by the PC to 75%, the print data for the second pass over the print area B is thinned out in advance by the PC to 25%, the print data for the third pass over the print area B is thinned out in advance by the PC to 25%, and the print data for the fourth pass over the print area B is thinned out in advance by the PC to 75% before they are supplied from the PC to the printing apparatus body. The thinned out print data thus received are printed in the associated passes (or scans) to complete an image.

In this arrangement, because the thinning out operation is done by the PC, the printing apparatus does not need to perform this operation and can be reduced in cost.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. An ink jet printing apparatus comprising:
   a printing means having a plurality of print heads with a plurality of nozzle groups, each of the nozzle groups using a predetermined number of print nozzles, each of the print heads ejecting one of inks of different colors;
   a main scanning means for moving the printing means relative to a print medium in a main scan direction;
   a sub-scanning means for moving the print medium a distance equal to the nozzle group relative to the printing means in a sub-scan direction, the sub-scan direction crossing the main scan direction; and
   a masking means for thinning out print data to a predetermined print density and supplying the thinned out print data to the associated nozzle group, the print data representing an image to be printed on associated one of print areas that are moved intermittently by the sub-scanning means;
   wherein the plurality of different nozzle groups are main-scanned M times (M≧2) over each of the print areas to print the print data to complete the image;
   wherein the print heads perform the main scans over each of the print areas at different print densities.

2. An ink jet printing apparatus according to claim 1, wherein the print heads generate bubbles in the inks by thermal energy and eject the inks by the bubbles.

3. An ink jet printing apparatus comprising:
   a printing means having a plurality of print heads with a plurality of nozzle groups, each of the nozzle groups using a predetermined number of print nozzles, each of the print heads ejecting one of inks of different colors;
   a main scanning means for moving the printing means relative to a print medium in a main scan direction;
   a sub-scanning means for moving the print medium a distance equal to the nozzle group relative to the printing means in a sub-scan direction, the sub-scan direction crossing the main scan direction; and
   a masking means for thinning out print data to a predetermined print density and supplying the thinned out print data to the associated nozzle group, the print data representing an image to be printed on associated one of print areas that are moved intermittently by the sub-scanning means;
   wherein the plurality of different nozzle groups are main-scanned M times (M≧2) over each of the print areas to print the print data to complete the image;

wherein the print heads successively execute the main scans over each of the print areas in such a way that, of the print heads adjoining in a printing order, the print head located at a front position in the printing order performs an Mth main scan with a lower print density than that of an Nth main scan ($1 \leq N < M$).

4. An ink jet printing apparatus comprising:

a printing means having a plurality of print heads with a plurality of nozzle groups, each of the nozzle groups using a predetermined number of print nozzles, each of the print heads ejecting one of inks of different colors;

a main scanning means for moving the printing means relative to a print medium in a main scan direction;

a sub-scanning means for moving the print medium a distance equal to the nozzle group relative to the printing means in a sub-scan direction, the sub-scan direction crossing the main scan direction; and a masking means for thinning out print data to a predetermined print density and supplying the thinned put print data to the associated nozzle group, the print data representing an image to be printed on associated one of print areas that are moved intermittently by the sub-scanning means;

wherein the plurality of different nozzle groups are main-scanned M times ($M \geq 2$) over each of the print areas to print the print data to complete the image;

wherein the print heads successively execute the main scans over each of the print areas in such a way that, of the print heads adjoining in a printing order, the print head located at a rear position in the printing order performs a first main scan with a lower print density than that of an nth main scan ($1 < n \leq M$).

5. An ink jet printing apparatus comprising:

a printing means having a plurality of print heads with a plurality of nozzle groups, each of the nozzle groups using a predetermined number of print nozzles, each of the print heads ejecting one of inks of different colors;

a main scanning means for moving the printing means relative to a print medium in a main scan direction;

a sub-scanning means for moving the print medium a distance equal to the nozzle group relative to the printing means in a sub-scan direction, the sub-scan direction crossing the main scan direction; and a masking means for thinning out print data to a predetermined print density and supplying the thinned put print data to the associated nozzle group, the print data representing an image to be printed on associated one of print areas that are moved intermittently by the sub-scanning means;

wherein the plurality of different nozzle groups ire main-scanned M times ($M \geq 2$) over each of the print areas to print the print data to complete the image;

wherein the print heads successively execute the lain scans over each of the print areas in such a way that, of the print heads adjoining in a printing order, the print head located at a front position in the printing order performs an Mth main scan with a lower print density than that of an Nth main scan ($1 \leq N < M$) and the print head located at a rear position in the printing order performs a first main scan with a lower print density than that of an nth main scan ($1 < n \leq M$).

6. An ink jet printing apparatus according to claim 5, wherein a surface tension of an ink ejected from the print head located at the front position in the printing order differs from a surface tension of an ink ejected from the print head located at the rear position in the printing order.

7. An ink jet printing apparatus according to claim 5, wherein the inks of different colors include a black ink as a first ink and a color ink as a second ink.

8. An ink jet printing apparatus according to claim 5, wherein the inks of different colors include a color ink as a first ink and a black ink as a second ink.

9. An ink jet printing apparatus comprising:

a printing means having a first and a second print head with a plurality of nozzle groups, each of the nozzle groups using a predetermined number of print nozzles, each of the print heads ejecting one of inks of different colors;

a main scanning means for moving the printing weans relative to a print medium in a main scan direction;

a sub-scanning means for moving the print medium a distance equal to the nozzle group relative to the printing means in a sub-scan direction, the sub-scan direction crossing the main scan direction; and a masking means for thinning out print data to a predetermined print density and supplying the thinned out print data to the associated nozzle group, the print data representing an image to be printed on associated one of print areas that are moved intermittently by the sub-scanning means;

wherein the plurality of different nozzle groups ire main-scanned M times ($M \geq 2$) over each of the print areas to print the print data to complete the image;

wherein the first and second print heads successively execute the main scans over each of the print areas in such a way that, of the first and second print heads, the first print head located at a front position in a printing order performs an Mth main scan with a lower print density than that of an Nth main scan ($1 \leq N < M$).

10. An ink jet printing apparatus comprising:

a printing means having a first and a second print head with a plurality of nozzle groups, each of the nozzle groups using a predetermined number of print nozzles, each of the print heads ejecting one of inks of different colors;

a main scanning means for moving the printing means relative to a print medium in a main scan direction;

a sub-scanning means for moving the print medium a distance equal to the nozzle group relative to the printing means in a sub-scan direction, the sub-scan direction crossing the main scan direction; and a masking means for thinning out print data to a predetermined print density and supplying the thinned out print data to the associated nozzle group, the print data representing an image to be printed on associated one of print areas that are moved intermittently by the sub-scanning means;

wherein the plurality of different nozzle groups ire main-scanned M times ($M \geq 2$) over each of the print areas to print the print data to complete the image;

wherein the first and second print heads successively execute the main scans over each of the print areas in such a way that, of the first and Second print heads, the second print head located at a rear position in a printing order performs a first main scan with a lower print density than that of an nth main scan ($1 < n \leq M$).

11. An ink jet printing apparatus comprising:

a printing means having a first and a second print head with a plurality of nozzle groups, each of the nozzle groups using a predetermined number of print nozzles, each of the print heads ejecting one of inks of different colors;

a main scanning means for moving the printing means relative to a print medium in a main scan direction;

a sub-scanning means for moving the print medium a distance equal to the nozzle group relative to the printing means in a sub-scan direction, the sub-scan direction crossing the main scan direction; and a masking means for thinning out print data to a predetermined print density and supplying the thinned out print data to the associated nozzle group, the print data representing an image to be printed on associated one of print areas that are moved intermittently by the sub-scanning means;

wherein the plurality of different nozzle groups are main-scanned M times (M≧2) over each of the print areas to print the print data to complete the image;

wherein the first and second print heads successively execute the main scans over each of the print areas in such a way that, of the first and second print heads, the first print head located at a front position in a printing order performs an Mth Lain scan with a lower print density than that of an Nth main scan (1≦N<M) and the second print head located at a rear position in a printing order performs a first main scan with a lower print density than that of an nth main scan (1<n≦M).

12. An ink jet printing method using an ink jet printing apparatus, the ink jet printing apparatus comprising:

a printing means having a plurality of print heads with a plurality of nozzle groups, each of the nozzle groups using a predetermined number of print nozzles, each of the print heads ejecting one of inks of different colors;

a main scanning means for moving the printing means relative to a print medium in a main scan direction;

a sub-scanning means for moving the print medium a distance equal to the nozzle group relative to the printing means in a sub-scan direction, the sub-scan direction crossing the main scan direction; and a masking means for thinning out print data to a predetermined print density and supplying the thinned out print data to the associated nozzle group, the print data representing an image to be printed on associated one of print areas that are moved intermittently by the sub-scanning means, the method comprising:

a main-scan step, of performing a scan of each print head by the main-scan means in accordance with the print data thinned out by the mask means; and a sub-scan step, of moving the print medium by the sub-scan means amount less than the printing width of the printing head, wherein said main-scan step and said sub-scan step are alternatively repeated and said main-scan step performs the main scans M times (M≦2) over each of the print areas to complete the image using a plurality of different nozzle groups, where each of the main scans is performed over each of the print areas by nozzle groups containing inks having different densities.

13. An ink jet printing method according to claim 12, wherein the print heads generate bubbles in the inks thermal energy and eject the inks by bubble generating forces.

14. An ink jet printing method using an ink jet printing apparatus, the ink jet printing apparatus comprising:

a printing means having a plurality of print heads with a plurality of nozzle groups, each of the nozzle groups using a predetermined number of print nozzles, each of the print heads ejecting one of inks of different colors;

a main scanning means for moving the printing means relative to a print medium in a main scan direction;

a sub-scanning means for moving the print medium a distance equal to the nozzle group relative to the printing means in a sub-scan direction, the sub-scan direction crossing the main scan direction; and a masking means for thinning out print data to a predetermined print density and supplying the thinned put print data to the associated nozzle group, the print data representing an image to be printed on associated one of print areas that are moved intermittently by the sub-scanning means, the method comprising:

a main-scan step, of performing a scan of each print head by the main-scan means in accordance with the print data thinned out by the mask means; and a sub-scan step, of moving the print medium by the sub-scan means an amount less than the printing width of the printing head, wherein said main-scan step and said sub-scan step are alternatively repeated and said main-scan step performs the main scans M times (M≦2) over each of the print areas to complete the image using a plurality of different nozzle groups, where each of the main scans is performed over each of the print areas by nozzle groups containing inks having different densities.

15. An ink jet printing method using an ink jet printing apparatus, the ink jet printing apparatus comprising:

a printing means having a plurality of print heads with a plurality of nozzle groups, each of the nozzle groups using a predetermined number of print nozzles, each of the print heads ejecting one of inks of different colors;

a main scanning means for moving the printing means relative to a print medium in a main scan direction;

a sub-scanning means for moving the print medium a distance equal to the nozzle group relative to the printing means in a sub-scan direction, the sub-scan direction crossing the main scan direction; and a masking means for thinning out print data to a predetermined print density and supplying the thinned out print data to the associated nozzle group, the print data representing an image to be printed on associated one of print areas that are moved intermittently by the sub-scanning means, the method comprising:

a main-scan step, of performing a scan of each print head by the main-scan means in accordance with the print data thinned out by the mask means; and a sub-scan step, of moving the print medium by the sub-scan means an amount less than the printing width of the printing head, wherein said main-scan step and said sub-scan step are alternatively repeated and said main-scan step performs the main scans M times (M≦2) over each of the print areas to complete the image using a plurality of different nozzle groups, where each of the main scans is performed over each of the print areas by nozzle groups containing inks having different densities.

16. An ink jet printing method using an ink jet printing apparatus, the ink jet printing apparatus comprising:

a printing means having a plurality of print heads with a plurality of nozzle groups, each of the nozzle groups using a predetermined number of print nozzles, each of the print heads ejecting one of inks of different colors;

a main scanning means for moving the printing means relative to a print medium in a main scan direction;

a sub-scanning means for moving the print medium a distance equal to the nozzle group relative to the printing means in a sub-scan direction, the sub-scan direction crossing the main scan direction; and a masking means for thinning out print data to a predetermined print density and supplying the thinned out print data to the associated nozzle group, the print data representing an image to be printed on associated one of print areas that are moved intermittently by the sub-scanning means, the method comprising:

a main-scan step, of performing a scan of each print head by the main-scan means in accordance with the print data thinned out by the mask means; and a sub-scan step, of moving the print medium by the sub-scan means an amount less than the printing width of the printing head, wherein said main-scan step and said sub-scan step are alternatively repeated and said main-scan step performs the main scans M times (M≦2) over each of the print areas to complete the image using a plurality of different nozzle groups, where each of the main scans is performed over each of the print areas by nozzle groups containing inks having different densities.

17. A printing method in an ink jet printing apparatus, the ink jet printing apparatus including: a printing means having a plurality of print heads with a plurality of nozzle groups, each of the nozzle groups using a predetermined number of print nozzles, each of the print heads ejecting one of inks of different colors; a main scanning means for moving the printing means relative to a print medium in a main scan direction; and a sub-scanning means for moving the print medium a distance equal to the nozzle group relative to the printing means in a sub-scan direction, the sub-scan direction crossing the main scan direction; wherein the ink jet printing apparatus performs printing based on print data supplied from an externally connected host device;

the printing method comprising the steps of:

thinning out the print data to a predetermined print density by the host device, the print data representing an image to be printed on associated one of print areas that are moved intermittently by the sub-scanning means;

sending the thinned out print data from the host device to the ink jet printing apparatus;

supplying the thinned out print data to the associated nozzle group; and main-scanning the plurality of different nozzle groups M times (M≧2) over each of the print areas to print the print data to complete the image;

wherein the print heads perform the main scans over each of the print areas at different print densities.

18. A printing method in an ink jet printing apparatus, the ink jet printing apparatus including: a printing means having a plurality of print heads with a plurality of nozzle groups, each of the nozzle groups using a predetermined number of print nozzles, each of the print heads ejecting one of inks of different colors; a main scanning means for moving the printing means relative to a print medium in a main scan direction; and a sub-scanning means for moving the print medium a distance equal to the nozzle group relative to the printing means in a sub-scan direction, the sub-scan direction crossing the main scan direction; wherein the ink jet printing apparatus performs printing based on print data supplied from an externally connected host device;

the printing method comprising the steps of:

thinning out the print data to a predetermined print density by the host device, the print data representing an image to be printed on associated one of print areas that are moved intermittently by the sub-scanning means;

sending the thinned out print data from the host device to the ink jet printing apparatus;

supplying the thinned out print data to the associated nozzle group; and main-scanning the plurality of different nozzle groups M times (M≦2) over each of the print areas to print the print data to complete the image;

wherein the print heads successively execute the lain scans over each of the print areas in such a way that, of the print heads adjoining in a printing order, the print head located at a front position in the printing order performs an Mth main scan with a lower print density than that of an Nth main scan (1≦N<M).

19. A printing method in an ink jet printing apparatus, the ink jet printing apparatus including: a printing means having a plurality of print heads with a plurality of nozzle groups, each of the nozzle groups using a predetermined number of print nozzles, each of the print heads ejecting one of inks of different colors; a main scanning means for moving the printing means relative to a print medium in a main scan direction; and a sub-scanning means for moving the print medium a distance equal to the nozzle group relative to the printing means in a sub-scan direction, the sub-scan direction crossing the main scan direction; wherein the ink jet printing apparatus performs printing based on print data supplied from an externally connected host device;

the printing method comprising the steps of:

thinning out the print data to a predetermined print density by the host device, the print data representing an image to be printed on associated one of print areas that are moved intermittently by the sub-scanning means;

sending the thinned out print data from the host device to the ink jet printing apparatus;

supplying the thinned out print data to the associated nozzle group; and main-scanning the plurality of different nozzle groups M times (M≧2) over each of the print areas to print the print data to complete the image;

wherein the print heads successively execute the lain scans over each of the print areas in such a way that, of the print heads adjoining in a printing order, the print head located at a rear position in the printing order performs a first main scan with a lower print density than that of an nth main scan (1<n≦M).

20. A printing method in an ink jet printing apparatus, the ink jet printing apparatus including: a printing means having a plurality of print heads with a plurality of nozzle groups, each of the nozzle groups using a predetermined number of print nozzles, each of the print heads ejecting one of inks of different colors; a main scanning means for moving the printing means relative to a print medium in a main scan direction; and a sub-scanning means for moving the print medium a distance equal to the nozzle group relative to the printing means in a sub-scan direction, the sub-scan direction crossing the main scan direction; wherein the ink jet printing apparatus performs printing based on print data supplied from an externally connected host device;

the printing method comprising the steps of:

thinning out the print data to a predetermined print density by the host device, the print data representing an image to be printed on associated one of print areas that are moved intermittently by the sub-scanning means;

sending the thinned out print data from the host device to the ink jet printing apparatus;

supplying the thinned out print data to the associated nozzle group; and main-scanning the plurality of different nozzle groups M times (M≧2) over each of the print areas to print the print data to complete the image;

wherein the print heads successively execute the rain scans over each of the print areas in such a way that, of the print heads adjoining in a printing order, the print head located at a front position in the printing order performs an Mth main scan with a lower print density than that of an Nth main scan ($1 \leq N < M$) and the print head located at a rear position in the printing order performs a first main scan with a Lower print density than that of an nth main scan ($1 < n \leq M$).

21. A printing method in an ink jet printing apparatus, the ink jet printing apparatus including: a printing means having a first and a second print head with a plurality of nozzle groups, each of the nozzle groups using a predetermined number of print nozzles, each of the print heads ejecting one of inks of different colors; a main scanning means for moving the printing means relative to a print medium in a main scan direction; and a sub-scanning means for moving the print medium a distance equal to the nozzle group relative to the printing means in a sub-scan direction, the sub-scan direction crossing the main scan direction; wherein the ink jet printing apparatus performs printing based on print data supplied from an externally connected host device;

the printing method comprising the steps of:

thinning out the print data to a predetermined print density by the host device, the print data representing an image to be printed on associated one of print areas that are moved intermittently by the sub-scanning means;

sending the thinned out print data from the host device to the ink jet printing apparatus;

supplying the thinned out print data to the associated nozzle group; and main-scanning the plurality of different nozzle groups M times ($M \geq 2$) over each of the print areas to print the print data to complete the image;

wherein the first and second print heads successively execute the main scans over each of the print areas in such a way that, of the first and second print heads, the first print head located at a front position in a printing order performs an Mth main scan with a lower print density than that of an Nth main scan ($1 \leq N < M$).

22. A printing method in an ink jet printing apparatus, the ink jet printing apparatus including: a printing means having a first and a second print head with a plurality of nozzle groups, each of the nozzle groups using a predetermined number of print nozzles, each of the print heads ejecting one of inks of different colors; a main scanning means for moving the printing means relative to a print medium in a main the print medium a distance equal to the nozzle group relative to the printing means in a sub-scan direction, the sub-scan direction crossing the main scan direction; wherein the ink jet printing apparatus performs printing based on print data supplied from an externally connected host device;

the printing method comprising the steps of:

thinning out the print data to a predetermined print density by the host device, the print data representing an image to be printed on associated one of print areas that are moved intermittently by the sub-scanning means;

sending the thinned out print data from the host device to the ink jet printing apparatus;

supplying the thinned out print data to the associated nozzle group; and main-scanning the plurality of different nozzle groups M times ($M \geq 2$) over each of the print areas to print the print data to complete the image;

wherein the first and second print heads successively execute the main scans over each of the print areas in such a way that, of the first and second print heads, the second print head located at rear position in a printing order performs a first main scan with a lower print density than that of an Nth main scan ($1 < n \leq M$).

23. A printing method in an ink jet printing apparatus, the ink jet printing apparatus including: a printing means having a first and a second print head with a plurality of nozzle groups, each of the nozzle groups using a predetermined number of print nozzles, each of the print heads ejecting one of inks of different colors; a main scanning means for moving the printing means relative to a print medium in a main scan direction; and a sub-scanning means for moving the print medium a distance equal to the nozzle group relative to the printing means in a sub-scan direction, the sub-scan direction crossing the main scan direction; wherein the ink jet printing apparatus performs printing based on print data supplied from an externally connected host device;

the printing method comprising the steps of:

thinning out the print data to a predetermined print density by the host device, the print data representing an image to be printed on associated one of print areas that are moved intermittently by the sub-scanning means;

sending the thinned out print data from the host device to the ink jet printing apparatus;

supplying the thinned out print data to the associated nozzle group; and main-scanning the plurality of different nozzle print the print data to complete the image;

wherein the first and second print heads successively execute the main scans over each of the print areas in such a way that, of the first and second print heads, the first print head located at a front position in a printing order performs an Mth main scan with a lower print density than that of an Nth main scan ($1 \leq N < M$) and the second print head located at a rear position in a printing order performs a first main scan with a lower print density than that of an nth main scan ($1 < n \leq M$).

* * * * *

UNITED STATES PATENT AND TRADEMARK OFFICE
CERTIFICATE OF CORRECTION

PATENT NO.     : 6,719,402 B2
DATED          : April 13, 2004
INVENTOR(S)    : Yoshinori Nakagawa et al.

It is certified that error appears in the above-identified patent and that said Letters Patent is hereby corrected as shown below:

Drawings,
FIG. 6, "4RD SCAN" should read -- 4TH SCAN --; "5RD SCAN" should read -- 5TH SCAN --; "6RD SCAN" should read -- 6TH SCAN --.

Column 1,
Line 26, "classed" should read -- classified --.

Column 2,
Lines 54 and 60, "refereed" should read -- referred --; and
Line 64, "return" should read -- returning --.

Column 3,
Line 63, "referring" should read -- referring to --.

Column 16,
Line 61, "consists" should read -- consist --.

Column 18,
Lines 34 and 60, "thinned out" should read -- thinned-out --.

Column 19,
Lines 19 and 45, "thinned out" should read -- thinned-out --;
Line 50, "ire" should read -- are --; and
Line 54, "lain" should read -- main --.

Column 20,
Line 13, "weans" should read -- means --;
Lines 20 and 47, "thinned out" should read -- thinned-out --;
Lines 25 and 52, "ire" should read -- are --; and
Line 57, "Second" should read -- second --.

Column 21,
Lines 8 and 38, "thinned out" should read -- thinned-out --.
Line 20, "Lain" should read -- main --;
Line 47, "amount" should read -- by an amount --; and
Line 57, "thermal" should read -- by thermal --.

UNITED STATES PATENT AND TRADEMARK OFFICE
CERTIFICATE OF CORRECTION

PATENT NO. : 6,719,402 B2
DATED : April 13, 2004
INVENTOR(S) : Yoshinori Nakagawa et al.

It is certified that error appears in the above-identified patent and that said Letters Patent is hereby corrected as shown below:

Column 22,
Lines 6 and 37, "thinned out" should read -- thinned-out --.

Column 23,
Line 2 and 66, "thinned out" should read -- thinned-out --.

Column 24,
Lines 1, 29, 31, 60 and 62, "thinned out" should read -- thinned-out --.
Lines 6, "thinned put" should read -- thinned out --.

Column 25,
Line 1, "rain" should read -- main --.
Line 8, "Lower" should read -- lower --;
Lines 29 and 31, "thined out" should read -- thinned-out --; and
Line 50, "main the print" should read -- main scan direction; and a sub-scanning means for moving the --.

Column 26,
Lines 6, 8, 39 and 41, "thinned out" should read -- thinned-out --; and
Lines 43-44, should read -- main-scanning the plurality of different nozzle groups M times (M≥ 2) over each of the print areas to print the print data to complete the image; --.

Signed and Sealed this

Twenty-first Day of September, 2004

JON W. DUDAS
*Director of the United States Patent and Trademark Office*